US010509751B2

(12) United States Patent
Yamashita et al.

(10) Patent No.: US 10,509,751 B2
(45) Date of Patent: Dec. 17, 2019

(54) INFORMATION PROCESSING APPARATUS THAT CONVERTS AN ADDRESS AND REQUESTER ID ON A LOCAL HOST TO AN ADDRESS AND REQUESTER ID ON A SYSTEM HOST

(71) Applicant: Panasonic Intellectual Property Management Co., Ltd., Osaka (JP)

(72) Inventors: Hideaki Yamashita, Kyoto (JP); Takeshi Ootsuka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/082,118

(22) PCT Filed: Mar. 8, 2017

(86) PCT No.: PCT/JP2017/009126
§ 371 (c)(1),
(2) Date: Sep. 4, 2018

(87) PCT Pub. No.: WO2017/154942
PCT Pub. Date: Sep. 14, 2017

(65) Prior Publication Data
US 2019/0065417 A1 Feb. 28, 2019

(30) Foreign Application Priority Data

Mar. 11, 2016 (JP) .................................. 2016-049040

(51) Int. Cl.
*G06F 13/36* (2006.01)
*G06F 13/40* (2006.01)

(52) U.S. Cl.
CPC .......... *G06F 13/36* (2013.01); *G06F 13/4022* (2013.01); *G06F 2213/0026* (2013.01); *G06F 2213/0058* (2013.01)

(58) Field of Classification Search
CPC combination set(s) only.
See application file for complete search history.

(56) References Cited

U.S. PATENT DOCUMENTS 8,583,848 B2 * 11/2013 Miyoshi ............... G06F 13/102
710/302
2012/0036306 A1 2/2012 Miyoshi
2013/0054867 A1 2/2013 Nishita

FOREIGN PATENT DOCUMENTS

JP 2012-38037 2/2012
JP 2013-45236 3/2013
(Continued)

OTHER PUBLICATIONS

International Search Report dated Jun. 13, 2017 in International (PCT) Application No. PCT/JP2017/009126.

*Primary Examiner* — Raymond N Phan
(74) *Attorney, Agent, or Firm* — Wenderoth, Lind & Ponack, L.L.P.

(57) ABSTRACT

In cases where local devices (6, 6a) support a master transfer function, a portion of the memory space, of each of local devices (6, 6a), to be controlled from system host (2) is mapped onto a memory space on system host (2) side and a plurality of local devices (6, 6a) are reconfigured as one virtual local device. This provides information processing apparatus (4) which, in cases of connection with the plurality of local devices (6, 6a), resolves resource shortage on system host (2) side by appropriately mapping necessary registers of local devices (6, 6a) onto a memory space for system host (2).

6 Claims, 27 Drawing Sheets

(56) References Cited

FOREIGN PATENT DOCUMENTS

| JP | 2013-88879 | 5/2013 |
|----|------------|--------|
| JP | 2014-2545  | 1/2014 |

* cited by examiner

FIG. 8

| 31 | | | | 0 | Byte Offset |
|---|---|---|---|---|---|
| Device ID | | | Vendor ID | | 00h |
| Status | | | Command | | 04h |
| Class Code | | | | Revision ID | 08h |
| BIST | Header Type | Master Latency Timer | | Cache Line Size | 0Ch |
| Base Address Registers | | | | | 10h |
| | | | | | 14h |
| | | | | | 18h |
| | | | | | 1Ch |
| | | | | | 20h |
| | | | | | 24h |
| Cardbus CIS Pointer | | | | | 28h |
| Subsystem ID | | | Subsystem Vendor ID | | 2Ch |
| Expansion ROM Base Address | | | | | 30h |
| Reserved | | | | Capabilities Pointer | 34h |
| Reserved | | | | | 38h |
| Max_Lat | Min_Gnt | Interrupt Pin | | Interrupt Line | 3Ch |

FIG. 9

| 31 | | | | Byte Offset |
|---|---|---|---|---|
| Device ID | | Vendor ID | | 00h |
| Status | | Command | | 04h |
| Class Code | | | Revision ID | 08h |
| BIST | Header Type | Primary Latency Timer | Cache Line Size | 0Ch |
| Base Address Registers 0 | | | | 10h |
| Base Address Registers 1 | | | | 14h |
| Secondary Latency Timer | Subordinate Bus Number | Secondary Bus Number | Primary Bus Number | 18h |
| Secondary Status | | I/O Limit | I/O Base | 1Ch |
| Memory Limit | | Memory Base | | 20h |
| Prefetchable Memory Limit | | Prefetchable Memory Base | | 24h |
| Prefetchable Base Upper 32 Bits | | | | 28h |
| Prefetchable Limit Upper 32 Bits | | | | 2Ch |
| I/O Limit Upper 16 Bits | | I/O Base Upper 16 Bits | | 30h |
| Reserved | | | Capability Pointer | 34h |
| Expansion ROM Base Address | | | | 38h |
| Bridge Control | | Interrupt Pin | Interrupt Line | 3Ch |

FIG. 10

| | Requester ID before conversion (bus/device/function) | Requester ID after conversion (bus/device/function) |
|---|---|---|
| System Host->Local Device | 0/1/0 | 0/2/0 |
| Local Device -> System Host | 0/2/0 | 0/1/0 |

FIG. 13

【Address conversion table】

(a) From system host to local device

| Before conversion | | After conversion | |
|---|---|---|---|
| Base Address | Size(Byte) | Base Address | Size(Byte) |
| 0x A000_0000 | 0x1000 | 0x F000_0000 | 0x 1000 |
| 0x A000_1000 | 0x1000 | 0x B000_0000 | 0x 1000 |

(b) From local device to system host

| Before conversion | | After conversion | |
|---|---|---|---|
| Base Address | Size(Byte) | Base Address | Size(Byte) |
| 0xC000_0000 | 0x1000 | 0xD000_0000 | 0x1000 |

FIG. 22

[Address conversion table]

(a) From system host to local device

| Before conversion | | After conversion | | |
|---|---|---|---|---|
| Base Address | Size(Byte) | Base Address | Size(Byte) | |
| 0xA000_0000 | 0x1000 | 0xF000_0000 | 0x1000 | Control register group |
| 0xA000_1000 | 0x1000 | 0xB001_0000 | 0x1000 | Local device (0) |
| 0xA000_2000 | 0x1000 | 0xB002_0000 | 0x1000 | Local device (1) |
| ⋮ | ⋮ | | | ⋮ |
| 0xA000_(N+1)000 | 0x1000 | 0xB00N_0000 | 0x1000 | Local device (N) |
| | | | | ⋮ |
| 0xA001_0000 | 0x1000 | 0xC000_0000 | 0x1000 | Local device (0xF) |

(b) From local device to system host

| Before conversion | | After conversion | |
|---|---|---|---|
| Base Address | Size(Byte) | Base Address | Size(Byte) |
| 0xC000_0000 | 0x1000 | 0xD000_0000 | 0x1000 |

FIG. 26
|  | Requester ID before conversion (bus/device/function), extended Tag | Requester ID after conversion (bus/device/function), Tag |
| --- | --- | --- |
| System Host <-> Local Device #0 | 0/1/0, 001xxxxxb | 0/1/0, 000xxxxxb |
| System Host <-> Local Device #1 | 0/1/0, 010xxxxxb | 0/1/1, 000xxxxxb |
FIG. 27
Device Control Register (Offset 08h)
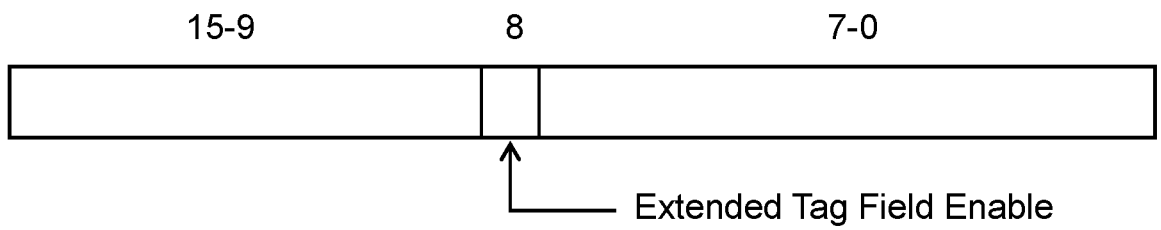
Extended Tag Field Enable
FIG. 28
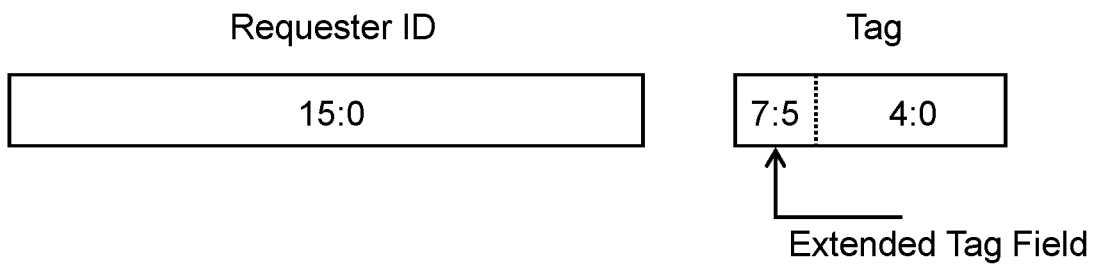
Extended Tag Field

INFORMATION PROCESSING APPARATUS THAT CONVERTS AN ADDRESS AND REQUESTER ID ON A LOCAL HOST TO AN ADDRESS AND REQUESTER ID ON A SYSTEM HOST

TECHNICAL FIELD

The present disclosure relates to an information processing apparatus that performs data transfer between a host and a device.

BACKGROUND ART

As a fast serial interface, PCI Express (registered trademark: hereinafter referred to as "PCIe") is used in various electronic devices, such as a personal computer.

PCIe is used in a system configuration, for example, using a video server as a system host and a memory card as a local device (for example, refer to PTL 1 to PTL 4).

CITATION LIST

Patent Literature

PTL 1: Unexamined Japanese Patent Publication No. 2014-2545
PTL 2: Unexamined Japanese Patent Publication No. 2013-45236
PTL 3: Unexamined Japanese Patent Publication No. 2013-88879
PTL 4: Unexamined Japanese Patent Publication No. 2012-38037

SUMMARY OF THE INVENTION

The present disclosure provides, in an information processing system using a PCIe bus including a system host and a local host, an information processing apparatus capable of realizing fast data transfer between a plurality of PCIe devices constituting local devices and the system host and of resolving resource shortage on the system host side.

That is, the present disclosure relates to an information processing apparatus that is connected with the system host via the PCIe bus. The information processing apparatus includes the local host and an advanced switching unit. The advanced switching unit has non-transparent ports as data input and output ports and a control register group for communication of the system host. The PCIe bus of the system host is connected to the plurality of PCIe devices via the information processing apparatus. A bus number of the PCIe bus on the system host side and a bus number of a PCIe bus on the local host side are assigned independently by the non-transparent ports, and an address space of the PCIe bus on the system host side and an address space of the PCIe bus on the local host side are configured independently, by the non-transparent ports, respectively. The control register group is directly accessed from the local host and is mapped onto a memory space on the system host side when the control register group is accessed from the system host. The local host interprets a command which is requested, by the system host, to the control register group mapped onto the memory space on the system host side and issues the command to each of the PCIe devices. The local host receives an interrupt of command complete from each of the PCIe devices and notifies the system host of the command completion via the control register group. Data transfer between the system host and each of the PCIe devices is performed via the advanced switching unit. The advanced switching unit converts an address and a Requester ID on the local host side into an address and a Requester ID on the system host side and transfers PCIe packets between each of the PCIe devices and the system host. Then, the advanced switching unit is configured to map, of a memory space on the local host side when each of the PCIe devices is seen from the local host, a portion of the memory space to be controlled from each of the PCIe devices onto the memory space on the system host side and reconfigure the plurality of PCIe devices as one virtual PCIe device.

According to the information processing apparatus of the present disclosure, in the information processing system including the system host and the local host, domains of two hosts are separated from each other and data transfer between each of the PCIe devices constituting the local devices and the system host can be performed at a high speed. In addition, in cases of connection with the plurality of PCIe devices, registers required for connection with the PCIe devices when seen from the system host are appropriately mapped onto a memory space. Thus, resource shortage on the system host side can be resolved.

BRIEF DESCRIPTION OF DRAWINGS

FIG. 8 is a diagram showing a configuration space (type 0) in a configuration register.

FIG. 9 is a diagram showing a configuration space (type 1) in the configuration register.

FIG. 10 is a diagram showing an example of a Requester ID conversion table.

FIG. 13 is a diagram showing an example of an address conversion table in the first exemplary embodiment.

FIG. 22 is a diagram showing an example of an address conversion table in the second exemplary embodiment.

FIG. 26 is a diagram showing an example of a Requester ID conversion table in the other exemplary embodiment.

FIG. 27 is a diagram describing an Extended Tag Field Enable bit in a device control register in the other exemplary embodiment.

FIG. 28 is a diagram describing a Requester ID and a Tag in the other exemplary embodiment.

DESCRIPTION OF EMBODIMENTS

Figure 1:
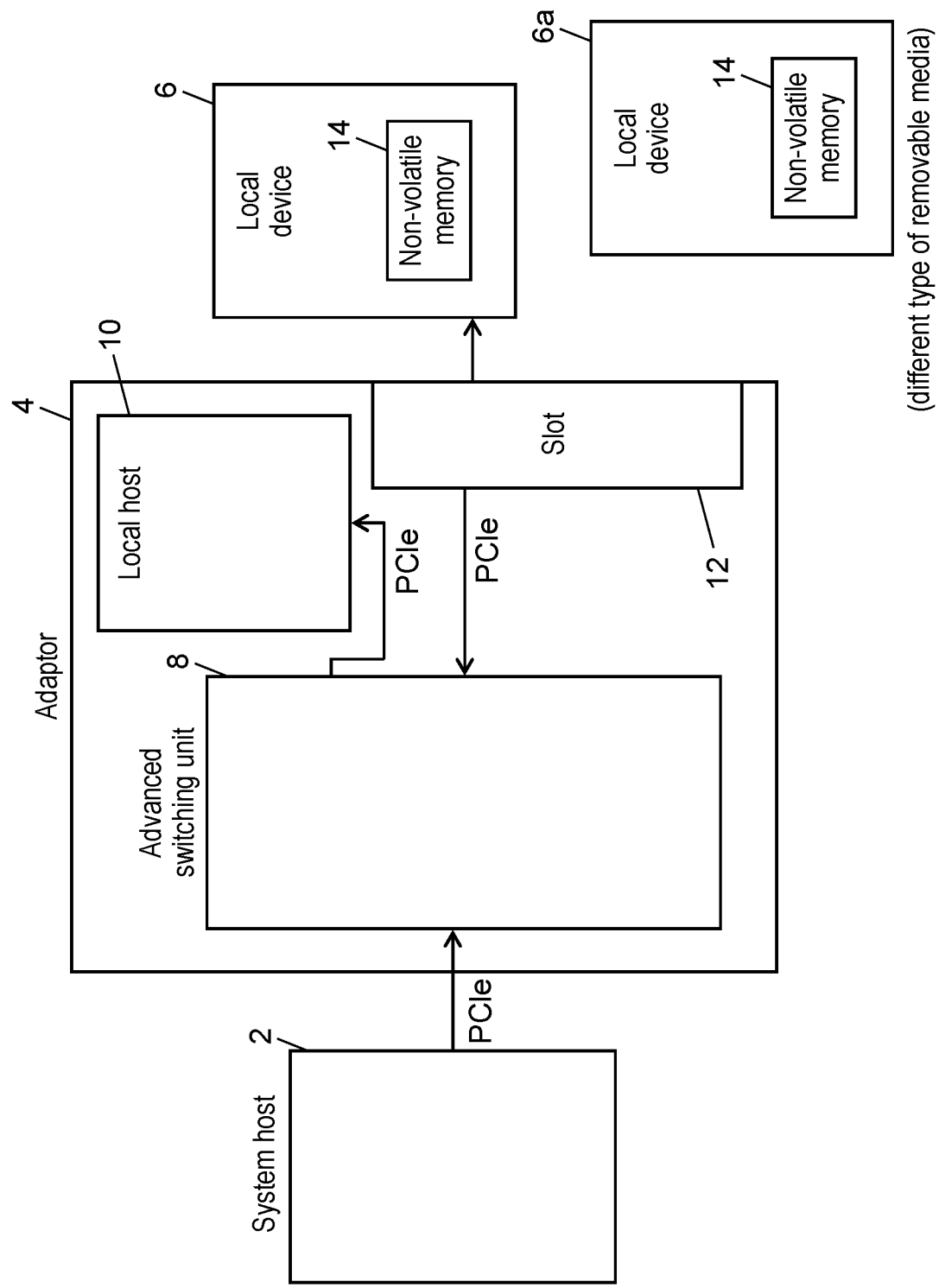
FIG. 1 is a schematic block diagram of an information processing system including an information processing apparatus according to a first exemplary embodiment.

Exemplary embodiments will be described below in detail with reference to the drawings. However, the following description may not include unnecessary details. For example, the description may not include details of already known matters or repeated reference to substantially identical configurations. This is for avoiding unnecessary redundancy of the following description and facilitating understanding by those skilled in the art.

The accompanying drawings and the following description are only presented to help those skilled in the art fully understand the present disclosure. It is therefore not intended that subject matters described in the scope of the appended claims be limited to the drawings and the description herein.

(Background to Exemplary Embodiments)

In an information processing system using PCIe, a root complex having a host function is configured as the most significant device. The root complex is connected to PCIe devices constituting local devices by point-to-point in a tree shape. Usually, only one root complex is connected to one PCIe device tree. That is, in an information processing system, usually, control of a plurality of hosts (for example, a system host and a local host) cannot be completely separated in each domain. Therefore, in the information processing system, the plurality of hosts restrict their operations with each other.

Thus, there is an information processing system provided with an address filter that separates data transfer destination for separately processing a plurality of hosts in each domain. However, even in this case, addresses are filtered partially and control of the plurality of hosts cannot be completely separated.

In addition, to solve the above problem, there is proposed a system that separates control of a plurality of hosts by using a PCIe switch having non-transparent ports (hereinafter, referred to as "NT ports". That is, root complexes are provided for the system host and the local host, respectively, and are connected with each other via the PCIe switch having the NT ports. This separates a system region (management region) to thereby enable communication between the system host and the local host. However, in a case of the above system, data transfer from the local device to the system host is limited by control of the local host. Therefore, speed of the data transfer is reduced.

Thus, the present exemplary embodiment provides, in an information processing system including a system host and a local host, an information processing apparatus that realizes fast data transfer between the local device and the system host while separating domains of the two hosts from each other.

In addition, the present exemplary embodiment, in cases of connection with local devices constituting a plurality of PCIe devices, maps registers necessary for the connection with the local devices to a memory space appropriately from the perspective of the system host. This provides an information processing apparatus capable of resolving resource shortage on the system host side.

(First Exemplary Embodiment)

An information processing system including an information processing apparatus of the first exemplary embodiment will be described below with reference to FIGS. 1 to 15.

(1.1. Configuration of Information Processing Apparatus)

First, a schematic configuration of the information processing system including the information processing apparatus of the present exemplary embodiment will be described with reference to FIG. 1.

FIG. 1 is a schematic block diagram of the information processing system including the information processing apparatus according to the first exemplary embodiment.

As shown in FIG. 1, the information processing system includes system host 2, adaptor 4, local device 6, and the like. Adaptor 4 constitutes the information processing apparatus and includes advanced switching unit 8, local host 10, slot 12, and the like. Local device 6 constitutes a PCIe device and includes non-volatile memory 14 and the like.

System host 2, adaptor 4, and local device 6 are connected with each other via a PCIe bus and slot 12.

Note that, local host 10 may be provided, for example, outside adaptor 4 or inside advanced switching unit 8. Local device 6 is exemplified, for example, by removable media, but is not limited to a specific type.

Next, a configuration of the information processing system including the information processing apparatus will be described in detail with reference to FIG. 2.

Figure 2:
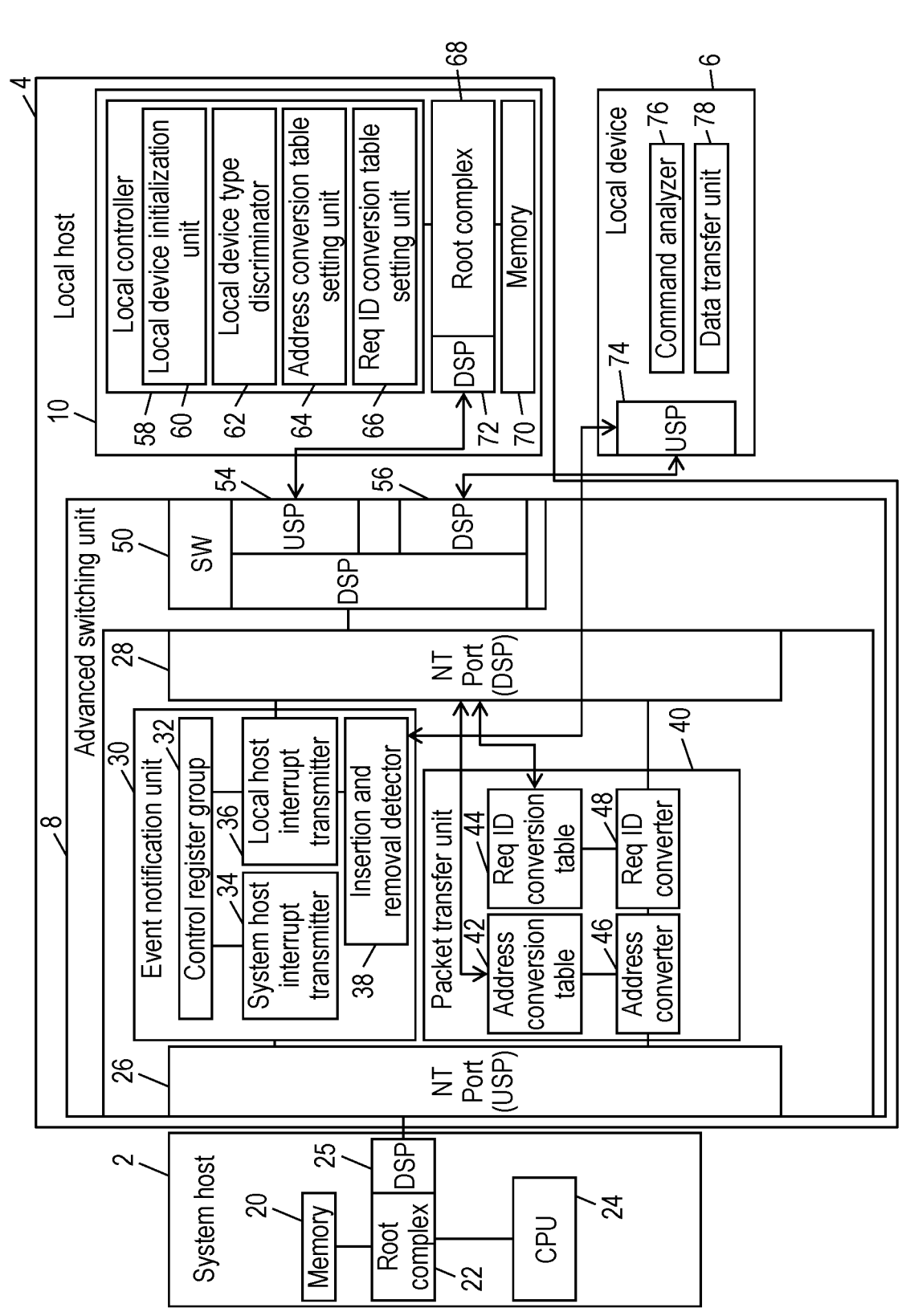
FIG. 2 is a detailed block diagram of the information processing system including the information processing apparatus according to the first exemplary embodiment.

FIG. 2 is a detailed block diagram of the information processing system including the information processing apparatus according to the first exemplary embodiment.

As shown in FIG. 2, system host 2 includes memory 20 as a main storage, processor 24, such as a CPU, root complex 22, and the like.

Root complex 22 constitutes a device serving as a root of a PCIe tree. Root complex 22 has Down Stream Port (DSP) 25 that is a port provided in a direction toward a terminal side, such as adaptor 4, for example. Meanwhile, Up Stream Port (USP) to be described below is a port provided in a direction from the terminal side toward upstream (processor 24)

Local device 6 includes, in addition to non-volatile memory 14 described above, command analyzer 76, data transfer unit 78, USP 74, and the like. Command analyzer 76 receives a data transfer command input from USP 74, interprets contents of the command, and performs processing corresponding to the contents of the data transfer command. Data transfer unit 78, in a case where the command interpreted by command analyzer 76 is a command accompanied with data transfer, performs data transfer from USP 74 via the PCIe bus. Note that, local device 6, when performing data transfer, may include a master function unit that is a function to initiate data transfer itself. The detail of the master function unit will be described below.

Adaptor 4 constituting the information processing apparatus includes advanced switching unit 8, local host 10, and the like. Note that, local host 10 may be provided outside, as described above.

Advanced switching unit 8 includes NT port 26 (non-transparent port) of USP, NT port 28 of DSP, event notification unit 30, packet transfer unit 40, PCIe switch 50, and the like.

Note that, the configuration of the information processing system using PCIe, usually, as described above, takes a form of a tree structure with a root complex as a root. Therefore, all devices connected to PCIe can be accessed from the root complex. However, as described above, basically in the information processing system using the PCIe, domain separation for each host or for each domain and provision of a plurality of root complexes cannot be performed.

Therefore, in the present exemplary embodiment, advanced switching unit 8 as a switch is treated as an endpoint device. This makes it possible to realize a form of separating, for example, two domains of the system host and the local host which are connected to the switch. At this time, NT port 26 and NT port 28 construct ports that realize the separation form.

Event notification unit 30 of advanced switching unit 8 includes control register group 32 composed of a plurality of control registers, system host interrupt transmitter 34, local host interrupt transmitter 36, insertion and removal detector 38, and the like. Control register group 32 constitutes a register group for communication accessible from system host 2 and local host 10. Control register group 32 has registers and a memory region for performing message exchange between system host 2 and local host 10. Note that, control register group 32 is used for registration of a request command from system host 2 to adaptor 4 and notification of command complete from adaptor 4 to system host 2.

System host interrupt transmitter 34 monitors a specific register of control register group 32. Then, system host interrupt transmitter 34, when having detected writing to the specific register from local host 10, notifies system host 2 of an event by interrupt to system host 2.

Local host interrupt transmitter 36, like system host interrupt transmitter 34, monitors a specific register of control register group 32. Then, local host interrupt transmitter 36, when having detected writing to the specific register from system host 2, notifies local host 10 of an event by interrupt to local host 10.

Insertion and removal detector 38 monitors a signal line indicating whether local device 6 is inserted into or removed from slot 12. Then, insertion and removal detector 38, when a state of the signal line has changed, requests interrupt to local host 10 from local host interrupt transmitter 36.

Packet transfer unit 40 of advanced switching unit 8 includes address conversion table 42, Req ID conversion table 44, address converter 46, Req ID converter 48, and the like. Address conversion table 42 is a table that describes correspondence relation for matching a system on the system host side with a system on the local host side in an address region. At this time, the systems of addresses on the system host side and on the local host side are configured with systems independent from each other. Note that, the above-described systems mean states in which for operations of the system host side and the local host side, configurations on the system host side and on the local host side are completed and initialization is completed.

Req ID conversion table 44 includes bus numbers, device numbers, and function numbers. Req ID conversion table 44 is a table that describes correspondence relation for matching a system on the system host side with a system on the local host side in the Req ID (Requester ID). Note that, the systems of bus numbers on the system host side and on the local host side are configured with systems independent from each other.

Address converter 46, when data is transferred from the system host to the local host side, converts an address on the system host side into an address on the local host side, based on information of address conversion table 42. Similarly, address converter 46, when data is transferred from the local host side to the system host side, converts an address on the local host side into an address on the system host side, based on information of address conversion table 42.

Req ID converter 48, when a Requester is transferred from the system host side to the local host side, converts a Req ID on the system host side into a Req ID on the local side, based on information of Req ID conversion table 44. Similarly, Req ID converter 48, when a Requester is transferred from the local host side to the system host side, converts a Req ID on the local host side into a Req ID on the system host side, based on information of Req ID conversion table 44.

Note that, FIG. 10 shows an example of Req ID conversion table 44 for converting a Requester ID between the system host side and the local side.

Further, a basic configuration of the information processing system using PCIe is peer-to-peer connection. Therefore, PCIe switch 50 includes a plurality of PCIe ports. This allows connection with a plurality of local devices via the PCIe ports.

Local host 10 is provided inside adaptor 4 in the exemplary embodiment shown in FIG. 2. Local host 10 includes local controller 58, root complex 68, memory 70 as a main storage, and the like.

Local controller 58 includes local device initialization unit 60, local device type discriminator 62, address conversion table setting unit 64, Req ID conversion table setting unit 66, and the like.

Local device initialization unit 60 performs initial setting of a configuration space of local device 6 to put local device 6 into an operable state.

Local device type discriminator 62 reads a configuration register of local device 6 and discriminates a type of local device 6. Thereby, local device type discriminator 62 switches, in the subsequent processing, to processing for each local device the type of which has been discriminated.

Address conversion table setting unit 64 obtains an address system on the system host side and an address system on the local host side. Then, address conversion table setting unit 64 registers address correspondence to address conversion table 42 of packet transfer unit 40 of advanced switching unit 8.

Req ID conversion table setting unit 66 obtains a Req ID on the system host side and a Req ID on the local host side. Then, Req ID conversion table setting unit 66 registers Req ID correspondence to Req ID conversion table 44 of packet transfer unit 40 of advanced switching unit 8.

Thus, the information processing system including the information processing apparatus is configured.

(1.2. Operation of Information processing apparatus)

An operation of the information processing system including the information processing apparatus will be described below with reference to FIG. 3.

Figure 3:
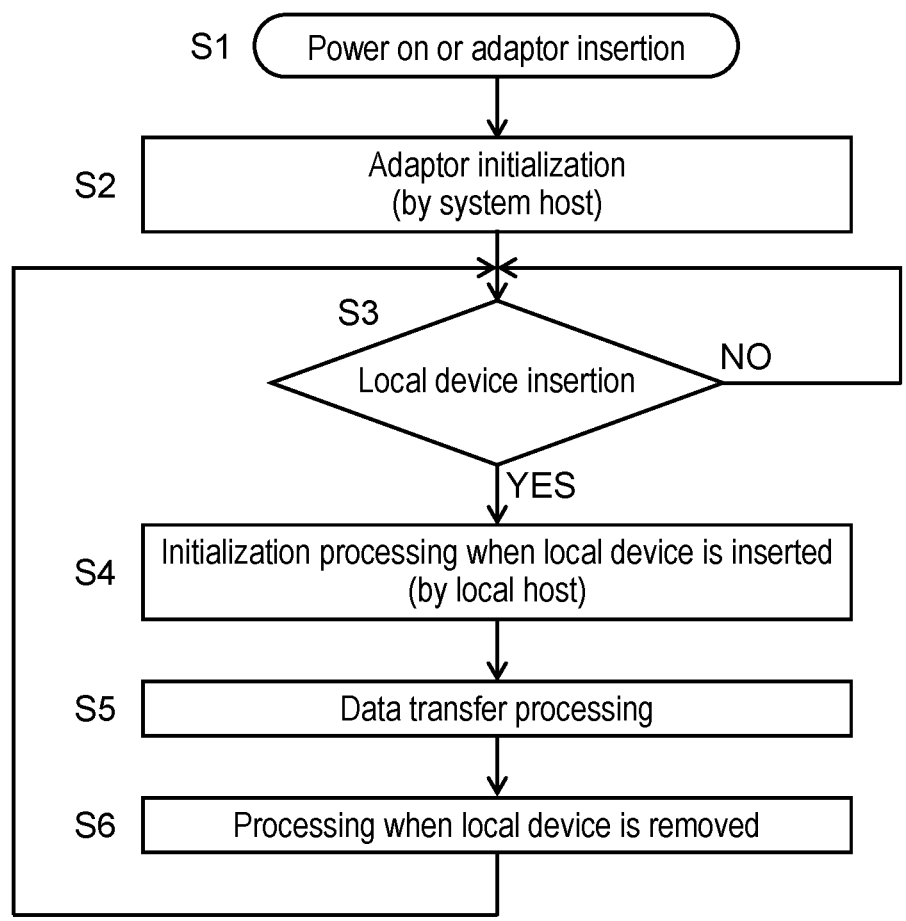
FIG. 3 is a flowchart showing an operation of the information processing apparatus according to the first exemplary embodiment.

FIG. 3 is a flowchart showing operations of the information processing apparatus and its peripheral apparatuses constructing the information processing system according to the first exemplary embodiment.

As shown in FIG. 3, the information processing apparatus and its peripheral apparatuses of the exemplary embodiment, when power is turned on or adaptor 4 is inserted into system host 2 (step S1), perform adaptor initialization (step S2), detection on whether or not a local device has been inserted (step S3), initialization processing when the local device is inserted (step S4), data transfer processing (step S5), processing when the local device is removed (step S6), and the like.

Note that, exchange of signals and data between devices and apparatuses in each operation will be described below in detail with reference to sequence charts shown in FIGS. 4 to 7.

(1.2.1. Adaptor Initialization Processing)

Figure 4:
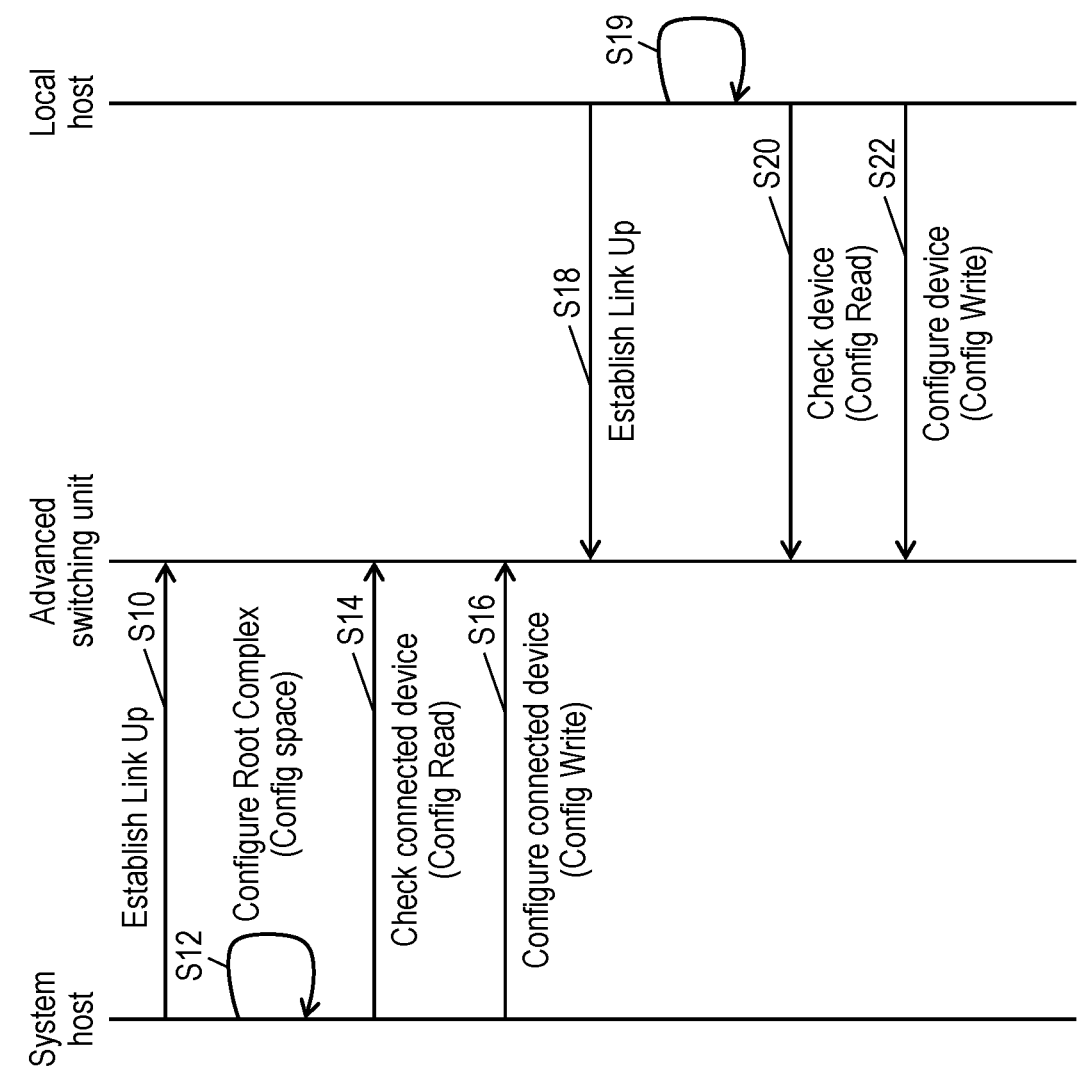
FIG. 4 is a sequence chart showing an operation of adaptor initialization processing in the information processing apparatus according to the first exemplary embodiment.

FIG. 4 is a sequence chart showing an operation of adaptor initialization processing in the information processing apparatus and its peripheral apparatuses according to the first exemplary embodiment.

As shown in FIG. 4, first, system host 2 establishes link-up with advanced switching unit 8 (step S10).

Next, system host 2 configures a configuration space (type 1) (refer to FIG. 9) in the configuration register at root complex 22 (step S12). Specifically, system host 2 sets a Memory Base and a Memory Limit of the configuration register.

Next, system host 2 reads a configuration register (type 0) (refer to FIG. 8) in advanced switching unit 8. Then, system host 2 checks a Device ID, a Vendor ID, and a Class Code in advanced switching unit 8 (step S14). Thus, system host 2 checks the connected device.

Next, system host 2 writes a Base Address Register and a Command into the configuration register (type 0) (refer to FIG. 8) in advanced switching unit 8 to configure the connected device (step S16).

Next, local host 10 establishes link-up with advanced switching unit 8 (step S18).

Next, local host 10 configures the configuration space (type 1) (refer to FIG. 9) in the configuration register at root complex 68 (step S19). Specifically, local host 10 particularly sets a Memory Base and a Memory Limit of the configuration register.

Next, local host 10 reads the configuration register (type 0) (refer to FIG. 8) in advanced switching unit 8. Then, local host 10 checks a Device ID, a Vendor ID, and a Class Code in advanced switching unit 8 (step S20). Thus, local host 10 checks the connected device.

Next, local host 10 writes a Base Address Register and a Command into the configuration register (type 0) (refer to FIG. 8) in advanced switching unit 8 to configure the connected device (step S22).

Thus, the adaptor initialization processing of the information processing apparatus and its peripheral apparatuses is performed.

(1.2.2. Initialization Processing when Local Device is Inserted)

Figure 5:
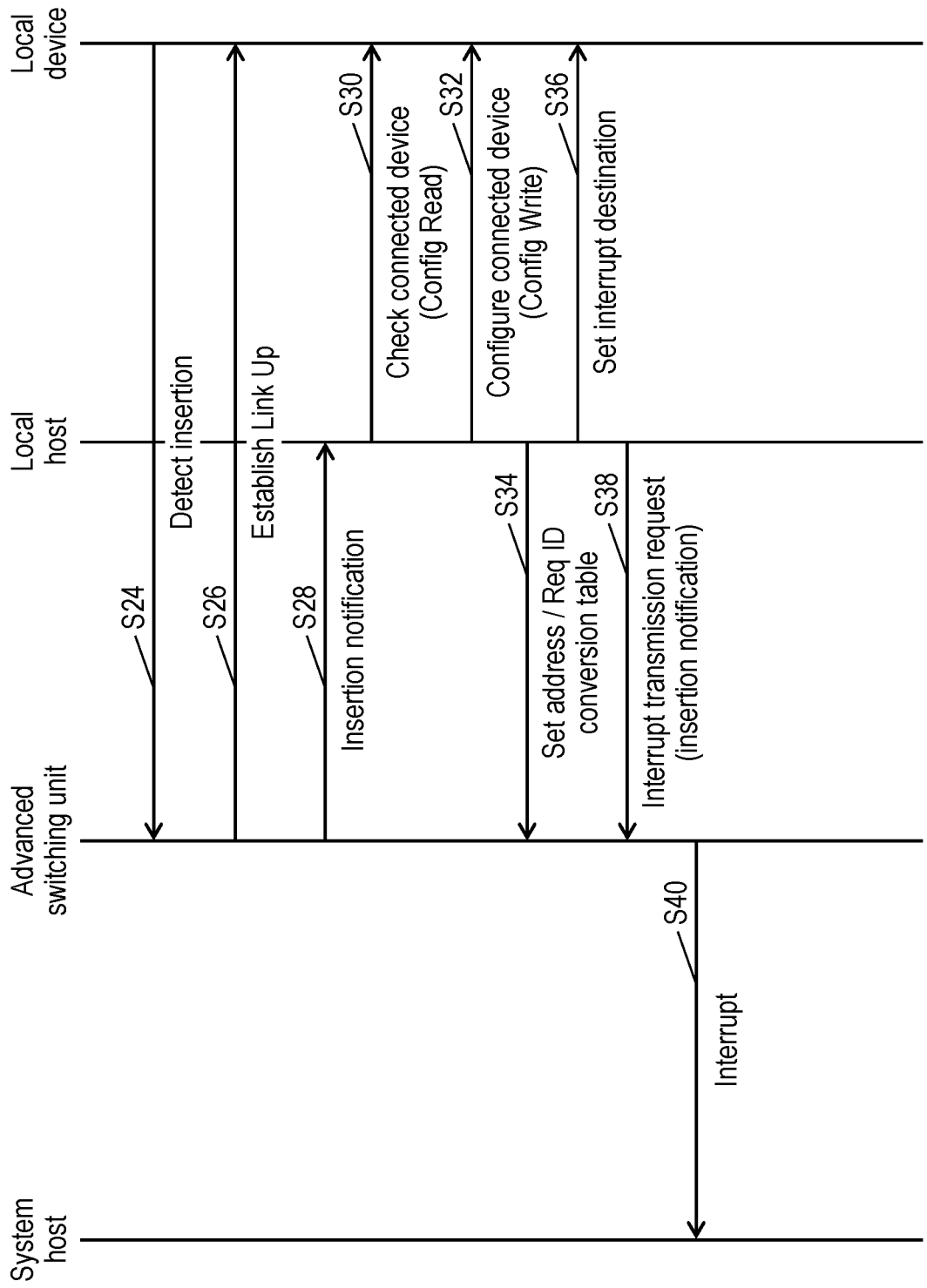
FIG. 5 is a sequence chart showing an operation of initialization processing when a local device is inserted in the information processing apparatus according to the first exemplary embodiment.

FIG. 5 is a sequence chart showing an operation of initialization processing when a local device is inserted in the information processing apparatus and its peripheral apparatuses of the first exemplary embodiment.

As shown in FIG. 5, first, local device 6 is inserted into slot 12 (refer to FIG. 1) of adaptor 4. At this time, local device 6 notifies advanced switching unit 8 of insertion via insertion and removal detector 38 of adaptor 4. Thereby, advanced switching unit 8 detects insertion of local device 6 (step S24).

Next, advanced switching unit 8 establishes link-up with local device 6 (step S26). Then, advanced switching unit 8 notifies local host 10 of insertion of local device 6 via local host interrupt transmitter 36 (step S28).

Next, local host 10 reads the configuration register (type 0) (refer to FIG. 8) in local device 6. Then, local host 10 checks a Device ID, a Vendor ID, and a Class Code in local device 6 (step S30). Thereby, local host 10 checks the connected device and determines a transfer system.

Next, local host 10 writes a Base Address Register and a Command into the configuration register (type 0) (refer to FIG. 8) in local device 6 to configure the connected device (step S32).

Next, local host 10 sets address conversion table 42 and Req ID conversion table 44 in packet transfer unit 40 of advanced switching unit 8 (step S34). The setting is performed by use of address conversion table setting unit 64 and Req ID conversion table setting unit 66 of local host 10.

Next, local host 10 sets system host 2 as an interrupt destination to local device 6 (step S36).

Next, local host 10 performs writing to a predetermined control register of event notification unit 30 of advanced switching unit 8 of adaptor 4. Then, local host 10 performs interrupt transmission request, to advanced switching unit 8, about insertion notification of local device 6 to system host 2 (step S38). Thereby, system host interrupt transmitter 34 of advanced switching unit 8, upon receiving the interrupt transmission request, performs interrupt about insertion notification of local device 6 to system host 2 (step S40).

That is, the interrupt transmission from local host 10 to system host 2 is performed via the control register of advanced switching unit 8.

Thus, the initialization processing of the information processing apparatus and its peripheral apparatuses when the local device is inserted is performed.

(1.2.3. Data Transfer Processing)

Figure 6:
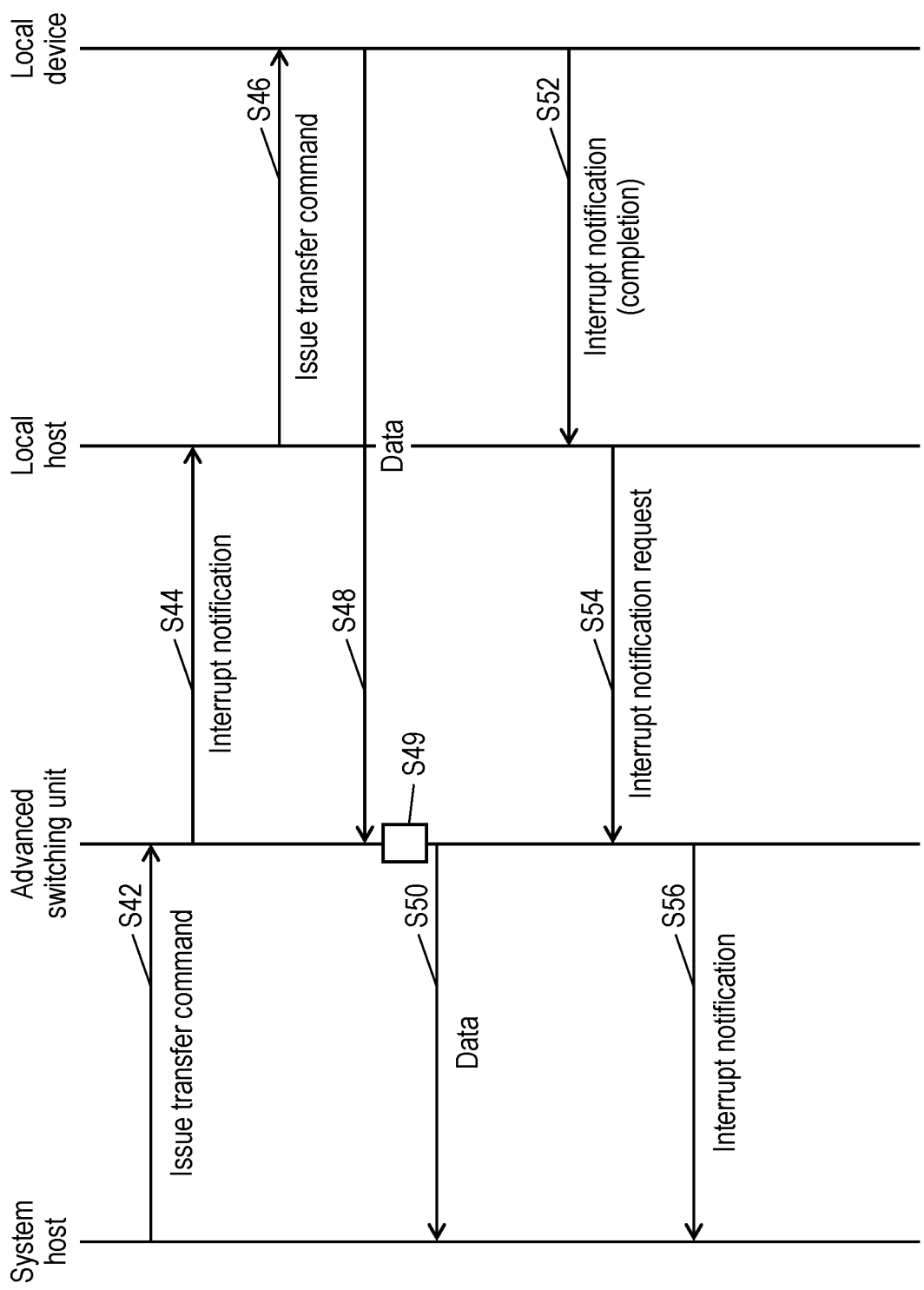
FIG. 6 is a sequence chart showing an operation of data transfer processing in the information processing apparatus according to the first exemplary embodiment.

FIG. 6 is a sequence chart showing an operation of data transfer processing in the information processing apparatus and its peripheral apparatuses of the first exemplary embodiment. Note that, FIG. 6 shows the operation by taking a case of transferring data from local device 6 to system host 2 as an example.

As shown in FIG. 6, first, system host 2 issues a transfer command to advanced switching unit 8 of adaptor 4 (step S42). Advanced switching unit 8, upon receiving the transfer command, performs writing into a predetermined control register in control register group 32 of event notification unit 30. Thereby, event notification unit 30 performs, to advanced switching unit 8, interrupt transmission request about issuance of the transfer command to local host 10.

Next, advanced switching unit 8, upon receiving the interrupt transmission request, performs interrupt notification about issuance of the transfer command to local host 10 (step S44). Local host 10 having received the interrupt notification issues a transfer command to local device 6 (step S46).

Next, local device 6 analyzes contents of the issued transfer command in command analyzer 76. Then, local device 6, based on the analysis result, transfers data, address, Req ID, and the like to advanced switching unit 8 via PCIe switch 50 by using data transfer unit 78 (step S48).

Next, advanced switching unit 8 converts the transferred address and Req ID by using address converter 46 and Req ID converter 48 (step S49).

Then, advanced switching unit 8 transfers data and the converted address and Req ID to system host 2 (step S50). Note that, transfer of data, address, Req ID, and the like is performed by use of PCIe packets.

Next, local device 6, upon completion of the transfer processing, transmits interrupt notification indicating completion to local host 10 (step S52). Note that, the interrupt notification is performed by MSI interrupt as will be described below with reference to FIGS. 8, 9, 11, and 12.

Next, local host 10, upon receiving the interrupt notification of completion, performs writing into a predetermined control register in control register group 32 of event notification unit 30 of advanced switching unit 8. Then, local host 10 performs, to advanced switching unit 8, interrupt transmission request about completion of transfer processing of local device 6 to system host 2 (step S54). Thereby, system host interrupt transmitter 34 of advanced switching unit 8, upon receiving the interrupt transmission request, performs interrupt notification about completion of transfer processing of local device 6 to system host 2 (step S56).

Thus, the data transfer processing of the information processing apparatus and its peripheral apparatuses is performed.

(1.2.4. Processing when Local Device is Removed)

Figure 7:
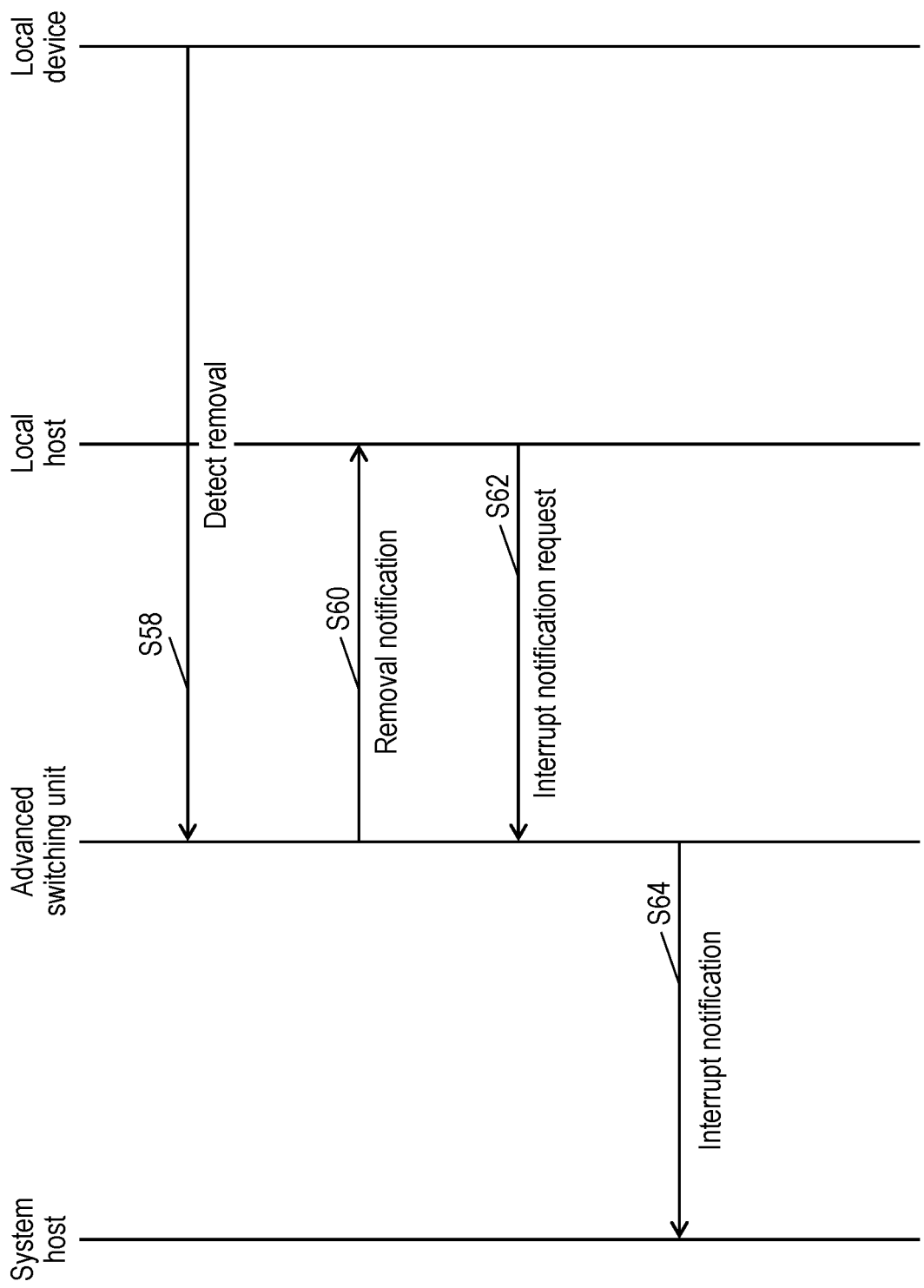
FIG. 7 is a sequence chart showing an operation of processing when the local device is removed in the information processing apparatus according to the first exemplary embodiment.

FIG. 7 is a sequence chart showing an operation when a local device is removed in the information processing apparatus and its peripheral apparatuses of the first exemplary embodiment.

As shown in FIG. 7, first, local device 6 is removed from slot 12 (refer to FIG. 1) of adaptor 4. At this time, insertion and removal detector 38 of adaptor 4 detects removal of local device 6 by potential change of a signal line connected to local device 6. Then, advanced switching unit 8 detects removal of local device 6 via insertion and removal detector 38 (step S58).

Next, advanced switching unit 8 notifies local host 10 of removal of local device 6 via local host interrupt transmitter 36 of event notification unit 30 (step S60).

Next, local host 10 performs writing into a predetermined control register in control register group 32 of event notification unit 30 of advanced switching unit 8. Then, local host 10 performs, to advanced switching unit 8, interrupt notification request about removal of local device 6 to system host 2 (step S62). Thereby, system host interrupt transmitter 34 of advanced switching unit 8, upon receiving the interrupt notification request, performs interrupt notification about removal of local device 6 to system host 2 (step S64).

Thus, the local removal processing of the information processing apparatus and its peripheral apparatuses is performed.

That is, in the information processing system of the first exemplary embodiment, as shown in FIGS. 4 to 7, exchange of control commands including interrupt between system host 2 and local host 10 is performed via control register group 32 in event notification unit 30 of advanced switching unit 8. Further, exchange of data, address, Req ID, and the like between system host 2 and local host 10 is performed via address converter 46 and Req ID converter 48 in packet transfer unit 40 of advanced switching unit 8. Therefore, data transfer is not limited by the control of local host 10. Thereby, data transfer speed is not reduced.

(1.2.5. MSI Interrupt)

The above-mentioned MSI interrupt will be described below with reference to FIGS. 8, 9, 11, and 12.

Figure 11:
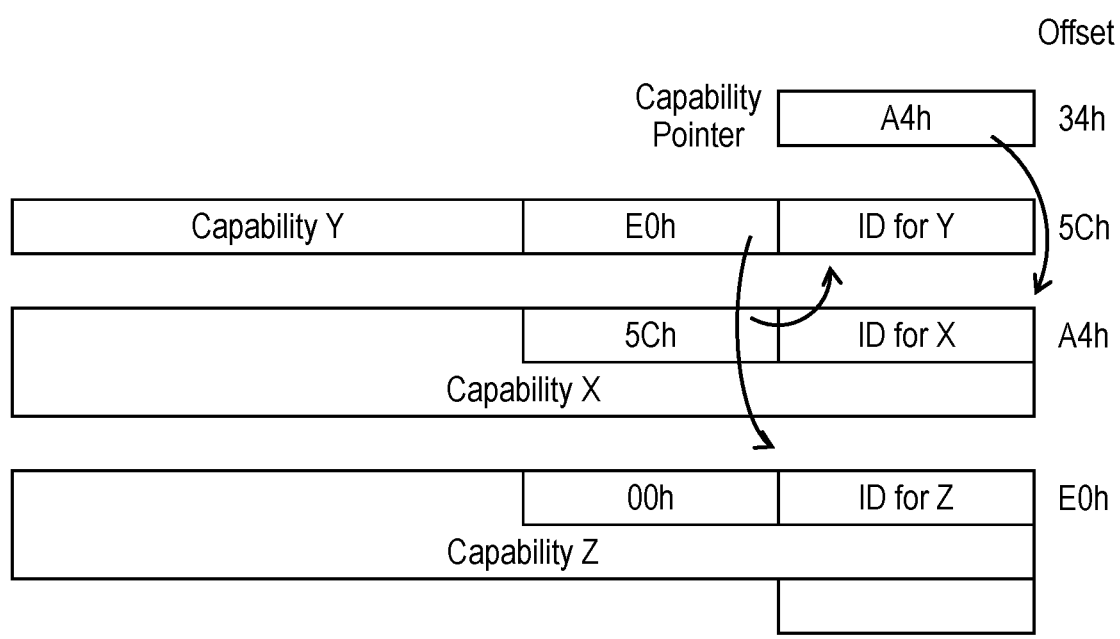
FIG. 11 is an explanatory diagram of a Capability register.

First, as shown in FIGS. 8 and 9, a "Capabilities Pointer" is stored in "34h" of the configuration register. The pointer of "34h" indicates an address for storing Capability. For example, as shown in FIG. 11, address A4h is stored in "34h" for storing the "Capabilities Pointer". A Capability ID as a content of Capability is stored in "A4h".

Note that, a plurality of settings of Capability ID can be stored. That is, as shown in FIG. 11, "5Ch" indicating a next "Capability Pointer" is stored in an address immediately adjacent to the address for storing the Capability ID. Further, "E0h" indicating a next "Capability Pointer" is stored in an address immediately adjacent to the address for storing the Capability ID of "5Ch" of the Capability Pointer. Thus, the configuration register is configured so that Capability IDs are provided in a chained manner.

Next, a configuration of a Capability ID indicating a content of Capability will be described with reference to FIG. 12.

Figure 12:
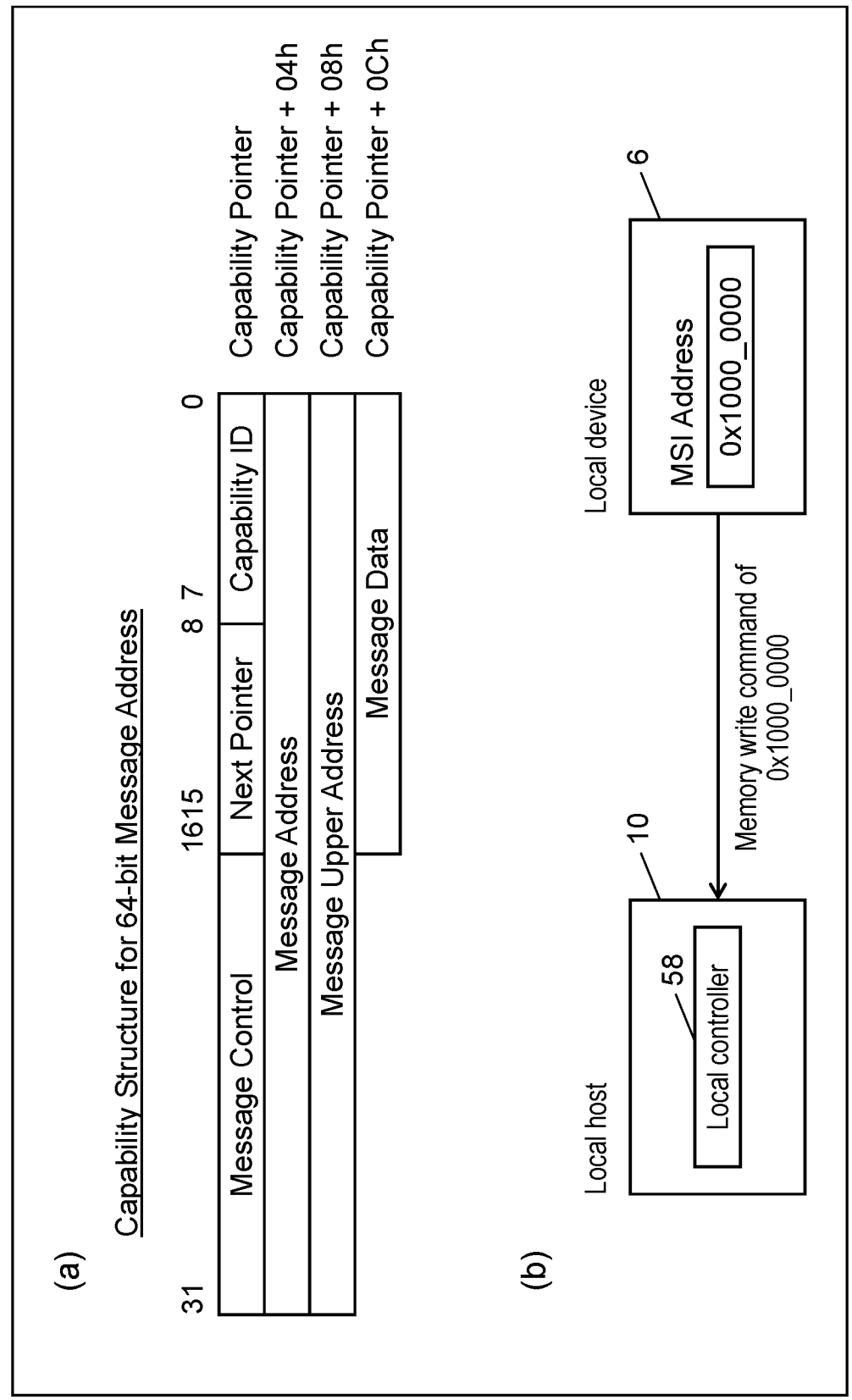
FIG. 12 is a diagram describing contents of a Capability Structure of Message Signalled Interrupt (MSI).

Part (a) of FIG. 12 is an explanatory diagram showing Capability structure in a case where a Capability ID is MSI interrupt setting. In the structure, as shown in part (b) of FIG. 12, as an address (Message Address) of MSI interrupt, for example, 0x1000_0000 is assumed to be set.

At this time, local device 6, for example, after completing execution of the transfer command, sets the address to 0x1000_0000 and issues a memory write command to local host 10.

Local controller 58 of local host 10 determines that interrupt has occurred by reception of the issued memory write command.

Thus, the MSI interrupt is executed.

(1.2.6. Example of Address Conversion)

One example of address conversion between system host 2 and local host 10 or local device 6 will be described below with reference to FIGS. 13 to 15.

Part (a) of FIG. 13 shows one example of an address conversion table from system host 2 to local device 6. Part (b) of FIG. 13 shows one example of an address conversion table from local device 6 to system host 2.

Figure 14:
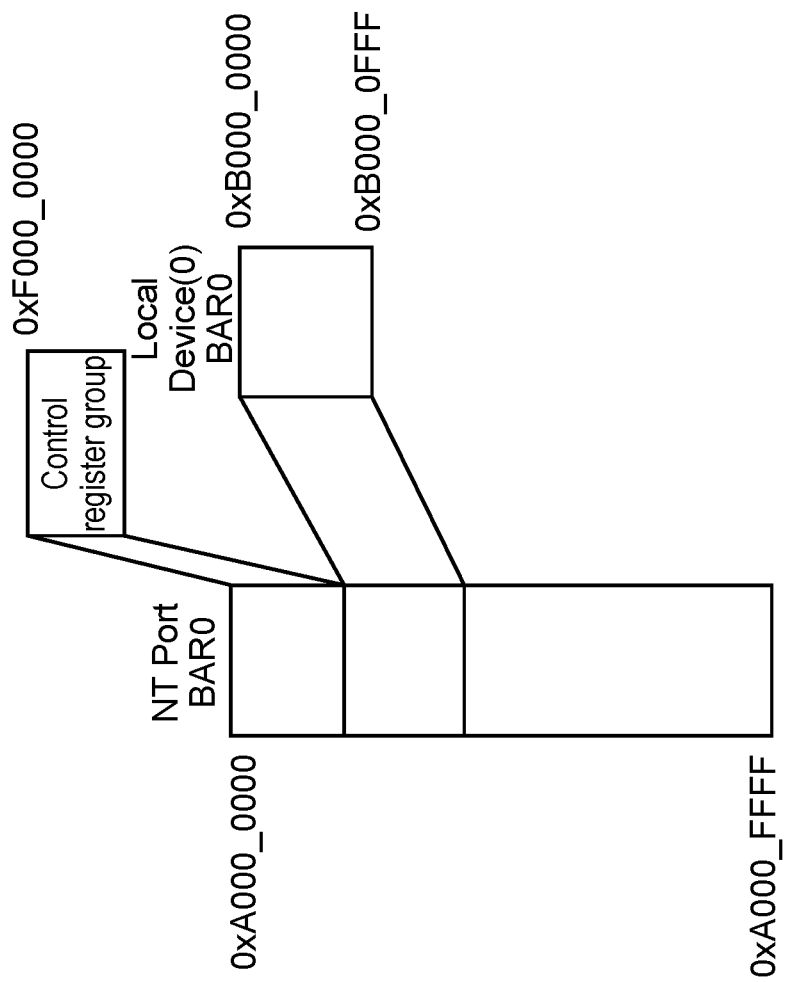
FIG. 14 is a diagram showing an example of address correspondence between the system host and the local device in the first exemplary embodiment.

FIG. 14 is a diagram showing correspondence relation of address conversion from system host 2 to local device 6 shown in part (a) of FIG. 13 in a BAR (Base Address Register) space.

As shown in FIG. 14, 0xA000_0000 to 0xA000_FFFF are assigned to addresses in a configuration space of system host 2.

At this time, as shown in part (a) of FIG. 13, 4K bytes (0x1000) from 0xA000_0000 of addresses of system host 2 shown in FIG. 14 correspond to 4K bytes (0x1000) from 0xF000_0000 on the local side. Further, 4K bytes (0x1000)

from 0xA000_1000 of system host 2 correspond to 4K bytes (0x1000) from 0xB000_0000 on the local side.

In addition, 4K bytes (0x1000) from 0xF000_0000 on the local side shown in part (a) of FIG. 13 are assigned to control register group 32 of advanced switching unit 8 shown in FIG. 14. Further, 4K bytes (0x1000) from 0xB000_0000 on the local side shown in part (a) of FIG. 13 are assigned to local device (0) as one local device shown in FIG. 14.

Figure 15:
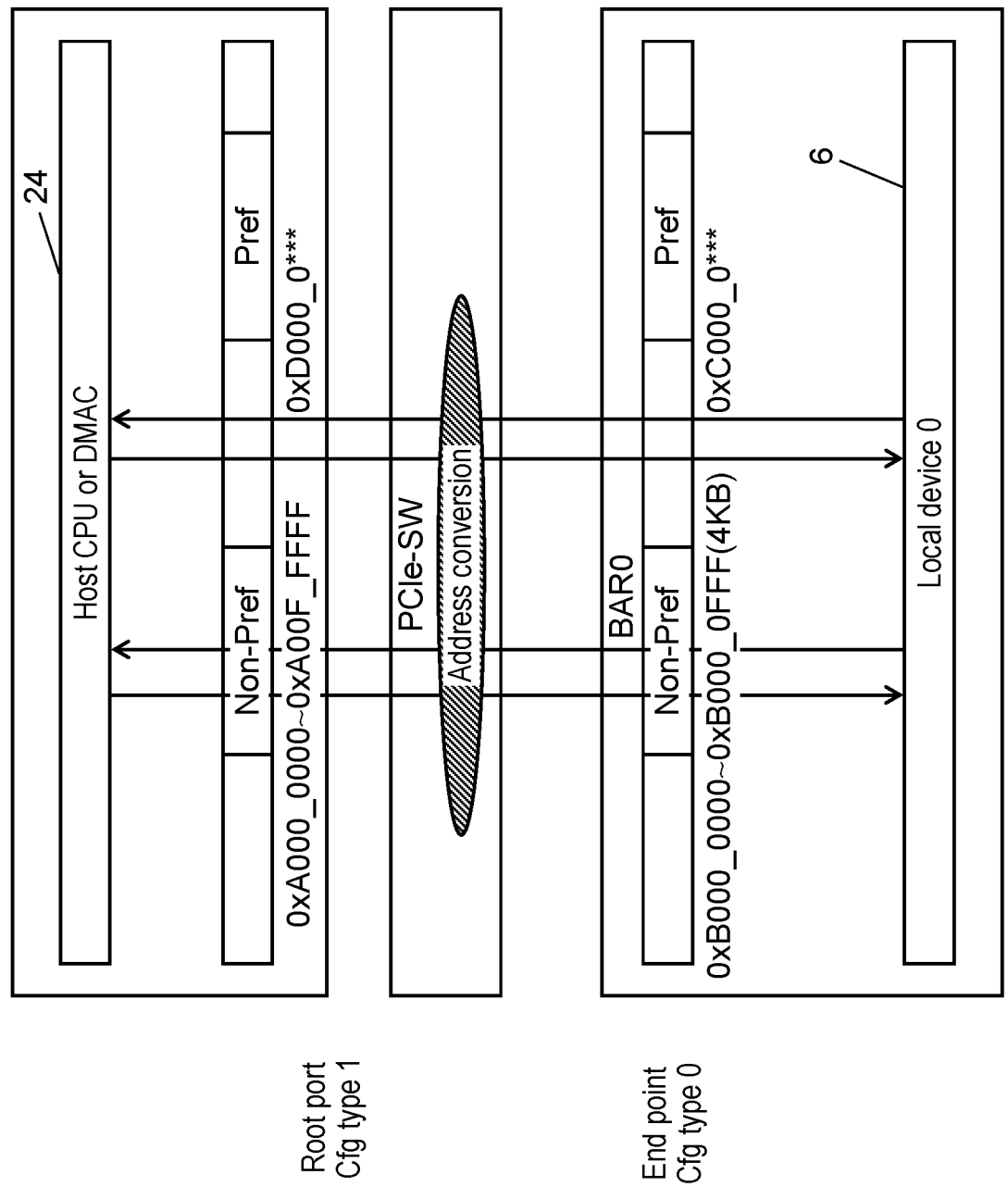
FIG. 15 is a diagram showing an example of address correspondence between the system host and the local device in the first exemplary embodiment.

FIG. 15 is a diagram showing correspondence relation of address conversion shown in FIG. 13 in the configuration space. Note that, a local device shown in FIG. 15 corresponds to local device (0) in FIG. 14.

As shown in FIG. 15, data transfer request from system host 2 to local device 6 is performed by use of a non-prefetch buffer space. That is, data transfer request is performed by use of virtual mapping on a memory space on system host 2 side.

To the configuration space on system host 2 side, 0xA000_0000 to 0xA00F_FFFF are assigned. Meanwhile, to the configuration space on local device 6 side corresponding to this, as shown in part (a) of FIG. 13, FIG. 14, and FIG. 15, 0xB000_0000 to 0xB000_0FFF are assigned.

At the time of data transfer request from system host 2 to local device 6, an address on system host 2 side is converted into an address on local device 6 side by the address conversion table shown in part (a) of FIG. 13.

In addition, at the time of data transfer request from local device 6 to system host 2, a space (in FIG. 15, a prefetch buffer space) other than the non-prefetch buffer space is used.

At this time, 0xC000_0000 to 0xC000_0FFF are assigned to the configuration space on local device 6 side. Meanwhile, to the configuration space on system host 2 side corresponding to this, as shown in part (b) of FIG. 13 and FIG. 15, 0xD000_0000 to 0xD000_0FFF are assigned.

Thereby, at the time of data transfer request from local device 6 to system host 2, addresses on local host 10 side and on local device 6 side are converted into addresses on system host 2 side by the address conversion table shown in part (b) of FIG. 13.

Thus, address conversion is correlated between system host 2 and local host 10 or local device 6.

(1.3. Effects and other benefits)

As described above, in the present exemplary embodiment, information processing apparatus 4 is connected with the system host by the PCIe bus. Information processing apparatus 4 includes local host 10 and advanced switching unit 8. Advanced switching unit 8 includes non-transparent ports 26, 28 as the data input and output ports and control register group 32 for communication of system host 2. The PCIe bus of system host 2 is connected to a plurality of PCIe devices 6 via information processing apparatus 4. A bus number of the PCIe bus on system host 2 side and a bus number of the PCIe bus on local host 10 side are assigned independently by the non-transparent ports 26, 28, and an address space of the PCIe bus on system host 2 side and an address space of the PCIe bus on local host 10 side are configured independently by non-transparent ports 26, 28. Control register group 32 is directly accessed from local host 10, and is mapped onto the memory space on system host 2 side from system host 2. Local host 10 interprets a command which is requested, by the system host 2, to control register group 32 mapped onto the memory space on system host 2 side and issues the command to each of PCIe devices 6. Local host 10 receives an interrupt of command complete from each of PCIe devices 6 and notifies system host 2 of the command completion via control register group 32. Data transfer between system host 2 and each of PCIe devices 6 is performed via advanced switching unit 8. Advanced switching unit 8 converts an address and a Requester ID on local host 10 side into an address and a Requester ID on system host 2 side and transfers PCIe packets between each of PCIe devices 6 and system host 2. Then, advanced switching unit 8 is configured to map, of a memory space on local host 10 side when each of the PCIe devices is seen from local host 10, a portion of the memory space to be controlled from each of PCIe devices 6 onto the memory space on system host 2 side and reconfigure the plurality of PCIe devices 6 as one virtual PCIe device 6.

Thus, information processing apparatus 4, in the information processing system using PCIe and including system host 2 and local host 10, can realize fast data transfer between local device 6 and system host 2 while separating domains of the two hosts from each other.

(Second Exemplary Embodiment)

An information processing system including an information processing apparatus of the second exemplary embodiment will be described below with reference to FIGS. 16 to 24.

(2.1. Configuration of Information Processing Apparatus)

First, a schematic configuration of the information processing system including the information processing apparatus of the present exemplary embodiment will be described with reference to FIG. 16.

Figure 16:
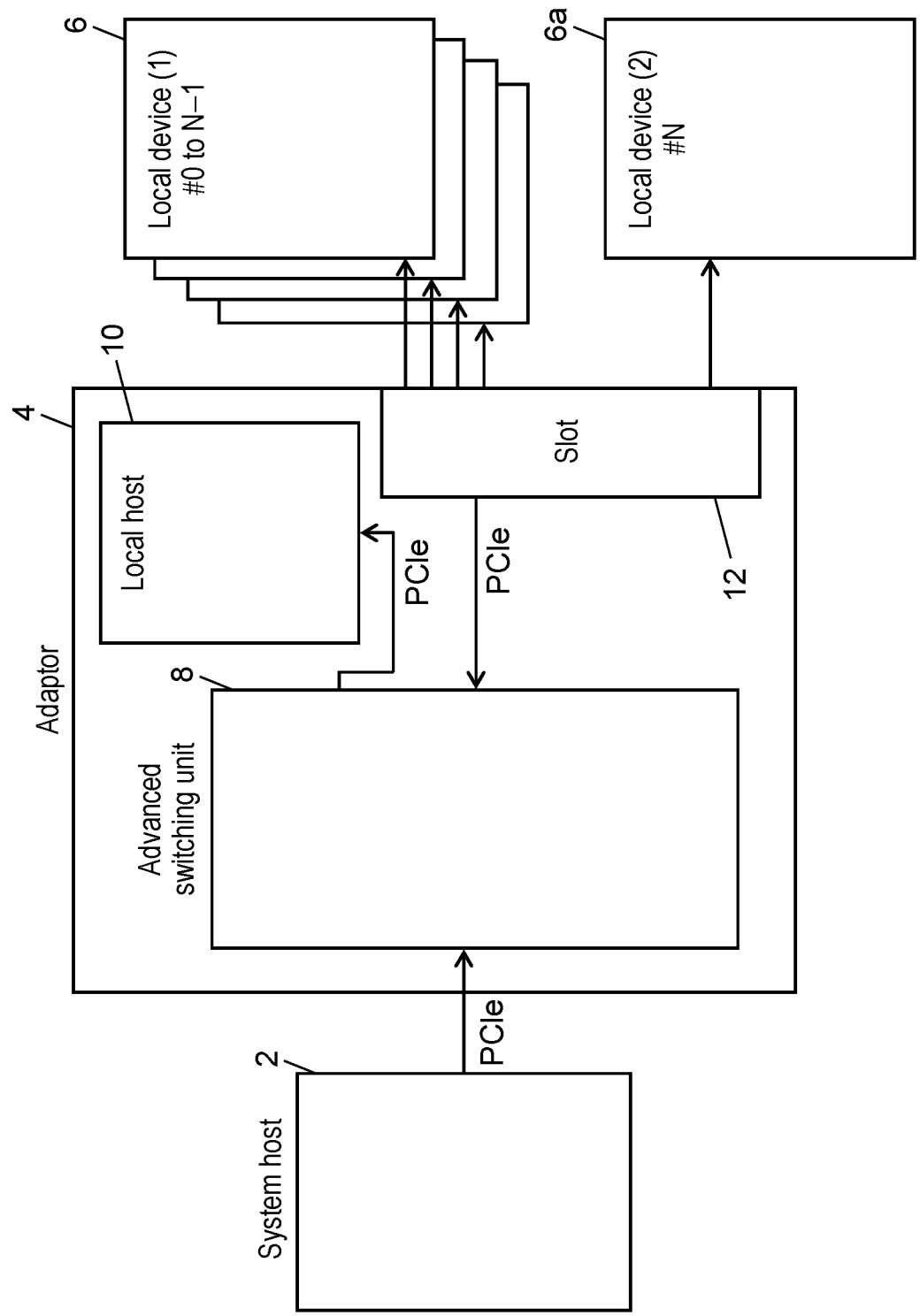
FIG. 16 is a schematic block diagram of an information processing system including an information processing apparatus according to a second exemplary embodiment.

FIG. 16 is a schematic block diagram of the information processing system including the information processing apparatus according to the second exemplary embodiment.

Note that, the information processing apparatus according to the second exemplary embodiment has almost the same configuration as that of the information processing apparatus according to the first exemplary embodiment shown in FIG. 1.

As shown in FIG. 16, the information processing system including the information processing apparatus of the present exemplary embodiment is different from that of the first exemplary embodiment in that the former includes a plurality of local devices 6, 6a connected via slot 12 and direct memory access transfer unit 47 (hereinafter, abbreviated as "DMA transfer unit 47") (refer to FIG. 17) in packet transfer unit 40 of advanced switching unit 8 to be described below. The configuration other than that has basically the same configuration as that of the information processing system including the information processing apparatus shown in FIG. 1.

That is, as shown in FIG. 16, the information processing system of the present exemplary embodiment includes system host 2, adaptor 4 constituting the information processing apparatus, a plurality of local devices 6 each having a master function unit, local device 6a having no master function unit, and the like.

Adaptor 4 constitutes the information processing apparatus and includes advanced switching unit 8, local host 10, slot 12, and the like. Local devices 6, 6a are connected to adaptor 4 via slot 12.

Note that, local host 10 may be provided, for example, outside adaptor 4 or inside advanced switching unit 8. Local device 6 is exemplified, for example, by removable media, but is not limited to a specific type.

Thus, the outline of the information processing system including the information processing apparatus is configured.

Next, a detailed configuration of the information processing system including the information processing apparatus will be described with reference to FIG. 17.

Figure 17:
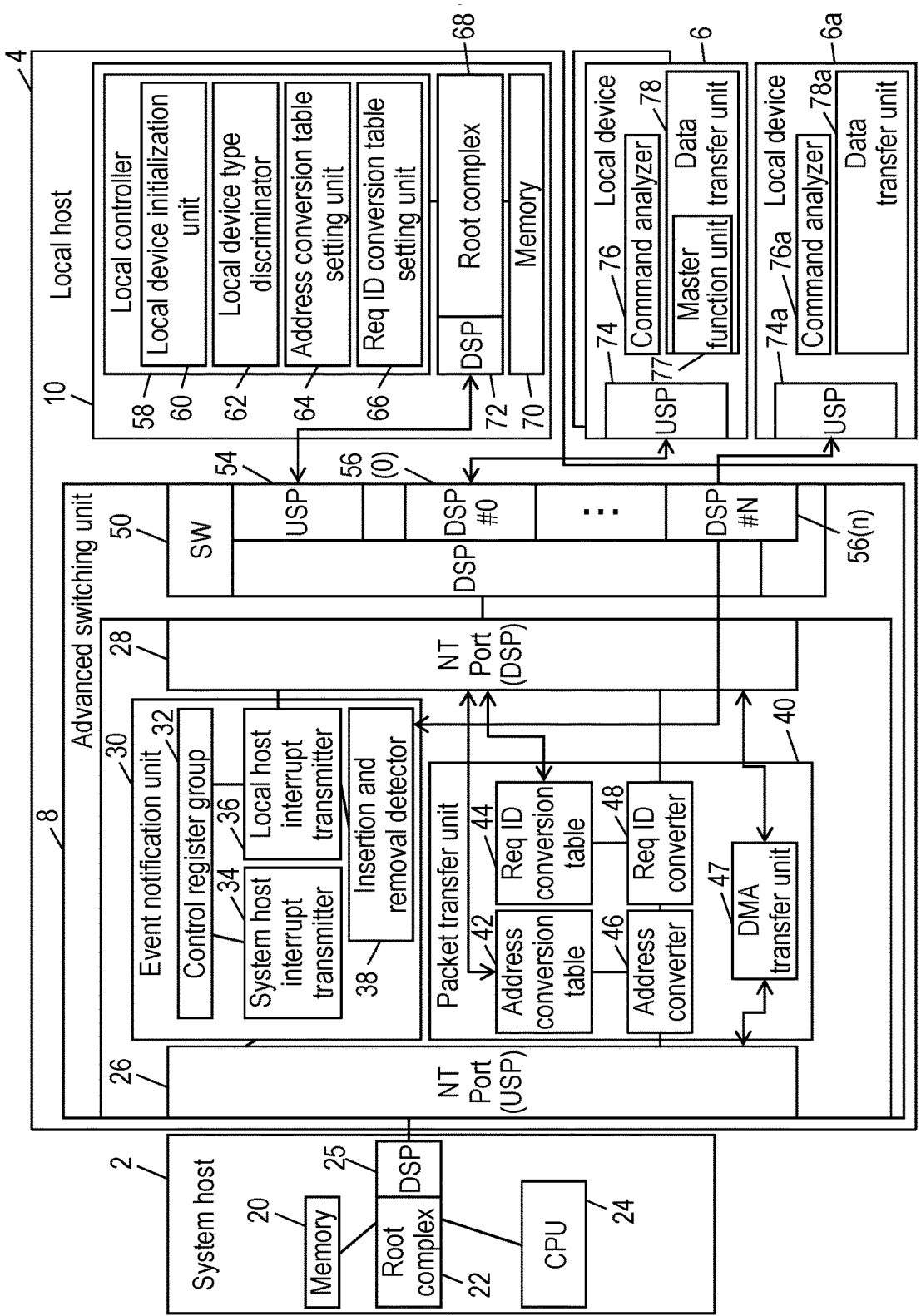
FIG. 17 is a detailed block diagram of the information processing system including the information processing apparatus according to the second exemplary embodiment.

FIG. 17 is a detailed block diagram of the information processing system including the information processing apparatus according to the second exemplary embodiment.

Note that, since the information processing system shown in FIG. 17 has almost the same basic configuration as that of the information processing system of the first exemplary embodiment, the different configuration will be described below in detail.

As shown in FIG. 17, in the information processing system of the present exemplary embodiment, PCIe switch 50 of adaptor 4 includes a plurality of DSPs (Down Stream Ports). The plurality of local devices 6, 6a are connected to PCIe switch 50 via respective DSPs. FIG. 17 shows an example of a configuration in which PCIe switch 50 is connected to a plurality of (N+1) local devices 6, 6a via DSPs of DSP #0 (56(0)), DSP #1 (56(1)), . . . , DSP #N–1 (56(n–1)), and DSP #N (56(n)).

At this time, the local device includes local devices 6 (DSPs #0 to #N–1) each having master function unit 77, local device 6a (DSP #N) having no master function unit 77, and the like. Note that, master function unit 77 is a function unit in which the local device itself initiates data transfer in performing data transfer.

Specifically, local device 6 of the present exemplary embodiment includes USP 74, command analyzer 76, data transfer unit 78 having master function unit 77, and the like. Meanwhile, local device 6a includes USP 74a, command analyzer 76a, data transfer unit 78a, and the like.

Further, the information processing system of the present exemplary embodiment, as described above, includes DMA transfer unit 47 in packet transfer unit 40 of advanced switching unit 8 of adaptor 4 constituting the information processing apparatus.

DMA transfer unit 47 performs writing control of data from system host 2 to local device 6a having no master function unit 77 and writing control of data from local device 6a to system host 2.

Specifically, DMA transfer unit 47, when writing data from system host 2 to local device 6a, issues a memory read command to system host 2 to obtain data. Then, DMA transfer unit 47 writes the obtained data to local device 6a by a memory write command.

Meanwhile, DMA transfer unit 47, when writing the data of local device 6a to system host 2, issues a memory read command to local device 6a to obtain data. Then, DMA transfer unit 47 writes the obtained data to system host 2 by a memory write command.

That is, data transfer is performed between local device 6a having no master function unit 77 and system host 2 via a direct transfer function of DMA transfer unit 47. Specifically, data transfer is performed between a memory space of local device 6a and a memory space on system host 2 side via DMA transfer unit 47.

Thus, the information processing system including the information processing apparatus is configured.

(2.2. Operation of Information Processing Apparatus)

An operation of the information processing system including the information processing apparatus will be described below with reference to FIG. 18.

Figure 18:
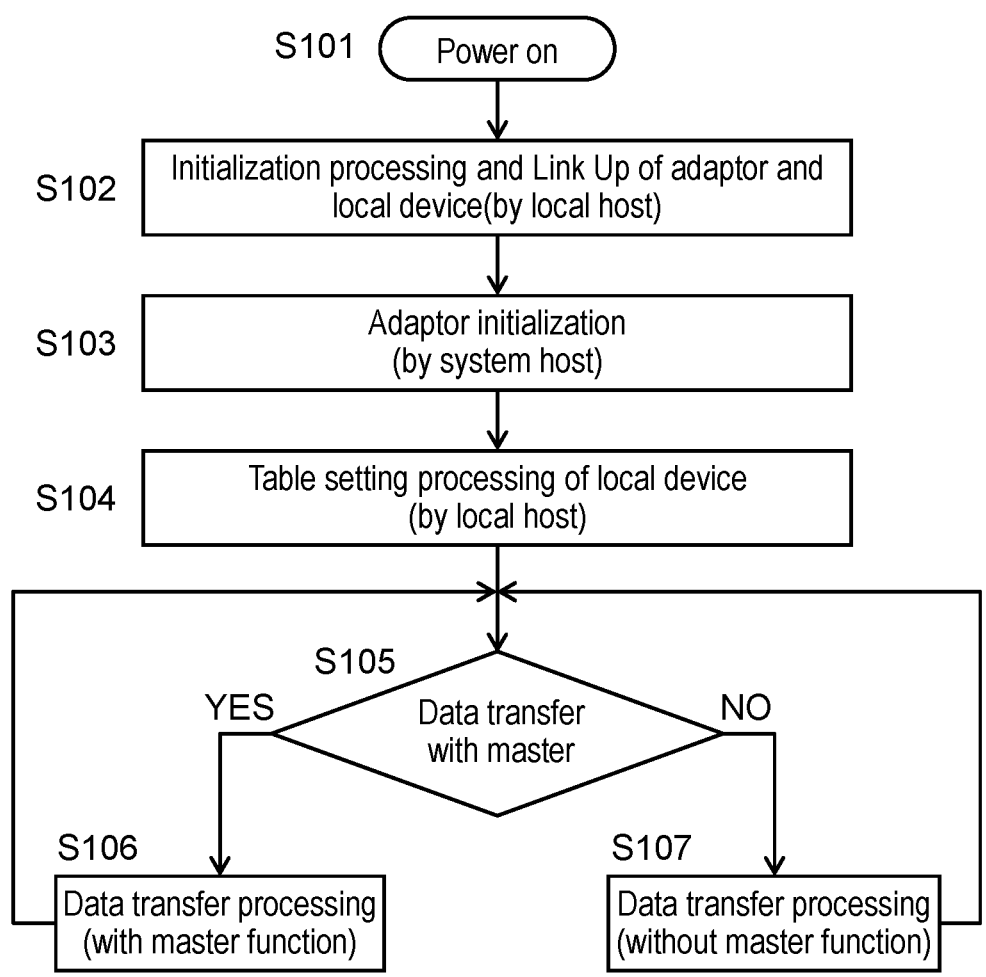
FIG. 18 is a flowchart showing an operation of the information processing apparatus according to the second exemplary embodiment.

FIG. 18 is a flowchart showing operations of the information processing apparatus and its peripheral apparatuses constructing the information processing system according to the second exemplary embodiment.

As shown in FIG. 18, the information processing apparatus and its peripheral apparatuses of the present exemplary embodiment, when power is turned on (step S101), perform initialization processing and link-up of the adaptor and the local device (step S102), adaptor initialization (step S103), and table setting processing of the local device (step S104). Further, according to determination of presence or absence of the master function unit (step S105), data transfer processing when the master function is provided (step S106) or data transfer processing when the master function is not provided (step S107) is performed.

Exchange of signals and data between devices and apparatuses in each operation will be described below in detail with reference to sequence charts shown in FIGS. 19 to 21.

(2.2.1. Initialization Processing and Link-Up of Adaptor and Local Device)

Figure 19:
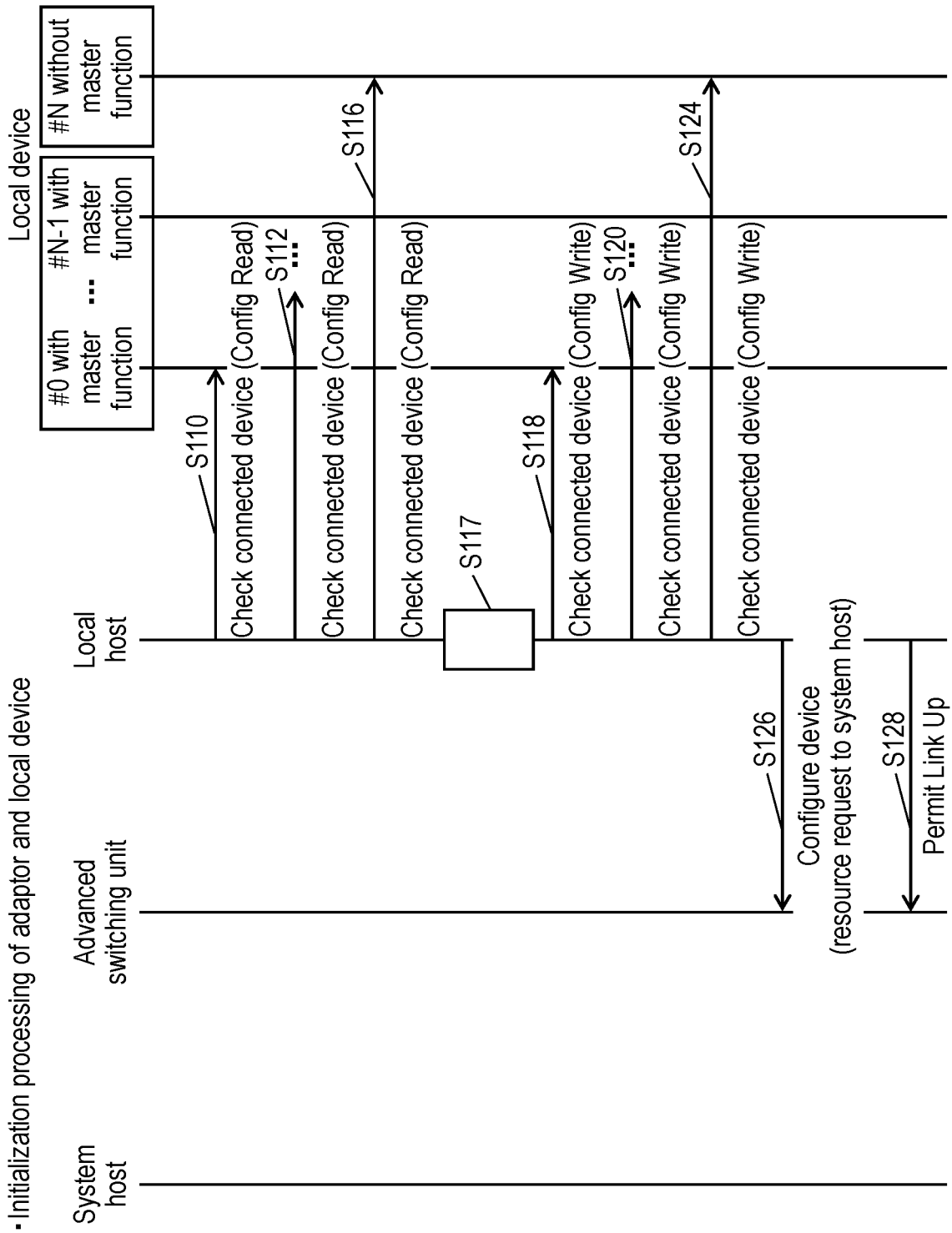
FIG. 19 is a sequence chart showing an operation of initialization processing of an adaptor and a local device in the information processing apparatus according to the second exemplary embodiment.

FIG. 19 is a sequence chart showing operations of initialization processing and link-up of the adaptor and the local device in the information processing apparatus and its peripheral apparatuses.

In the sequence shown in FIG. 19, first, assuming a state in which power is turned on and N (from #0 to #N–1) local devices 6 each having master function unit 77 and one (#N) local device 6a having no master function unit are already inserted into slot 12 of adaptor 4, subsequent processing will be described.

In the above state, local host 10 reads configuration registers (type 0) (refer to FIG. 8) of local devices 6, 6a. Then, local host 10 checks, for example, contents, such as Device IDs, Vendor IDs, and Class Codes (steps S110 to S116). Thus, local host 10 checks the connected device.

Then, after checking the contents, local host 10 performs calculation of resources, based on the obtained information of local devices 6, 6a (step S117).

Next, local host 10 writes predetermined contents into the configuration registers (type 0)(refer to FIG. 8) of local devices 6, 6a, based on the calculation result of resources to configure the connected devices (steps S118 to S124). Here, the predetermined contents include, for example, Base Address Register, Command, and the like.

Next, based on the calculation result of resources, local host 10 registers a resource request command to system host 2 in control register group 32 of event notification unit 30 of advanced switching unit 8. Thus, local host 10 configures the local device (step S126). Further, local host 10 registers a link-up permission command from system host 2 in control register group 32 (step S128).

Thus, the initialization processing and link-up of adaptor 4 and local devices 6, 6a are performed.

(2.2.2. Adaptor Initialization Processing)

Figure 20:
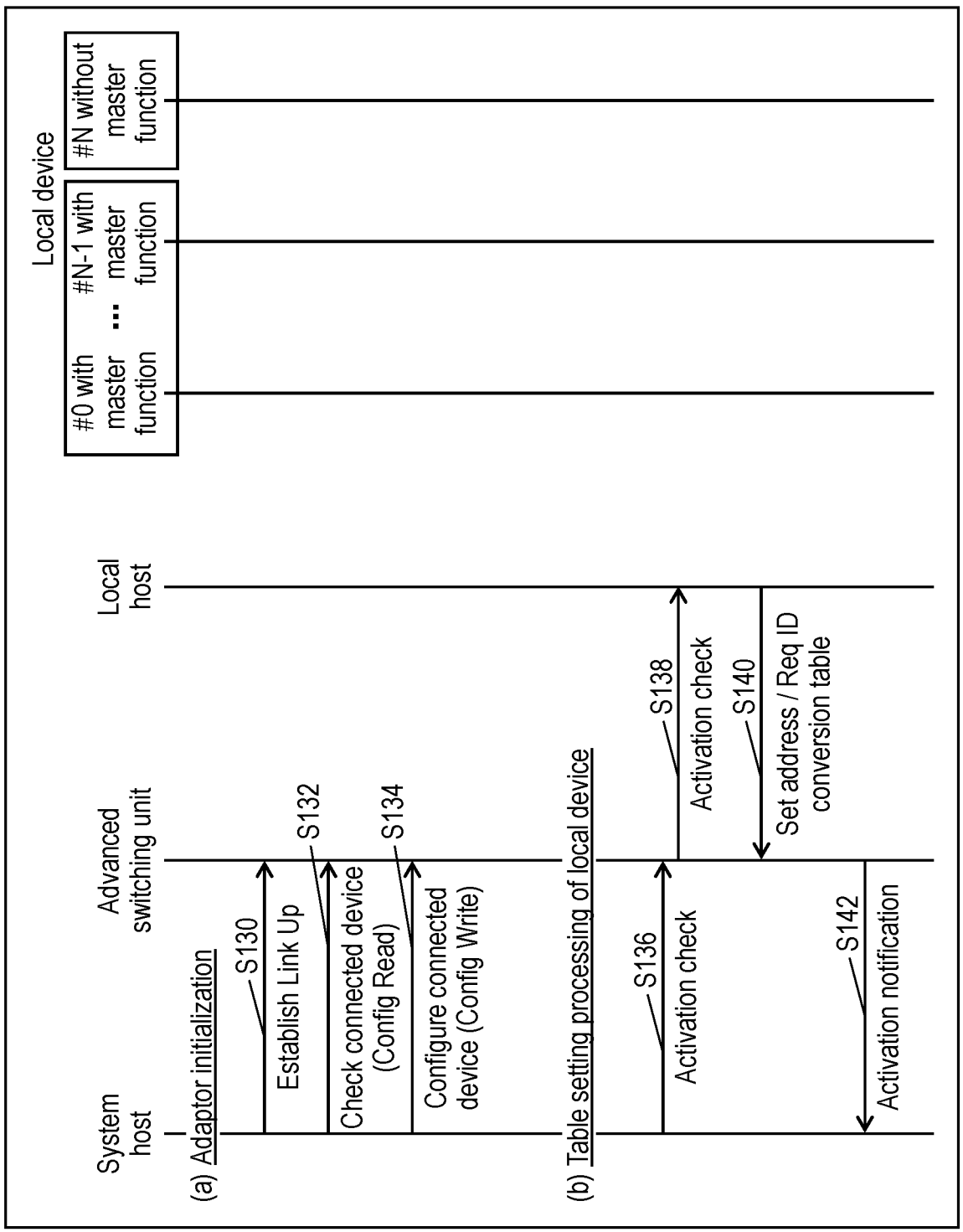
FIG. 20 is a sequence chart showing an operation of adaptor initialization processing and an operation of table setting processing of the local device in the information processing apparatus according to the second exemplary embodiment.

Part (a) of FIG. 20 is a sequence chart showing operations of adaptor initialization processing in the information processing apparatus and its peripheral apparatuses.

As shown in part (a) of FIG. 20, first, system host 2 establishes link-up with advanced switching unit 8 (step S130).

Next, system host 2 reads a configuration register (type 0) (refer to FIG. 8) in advanced switching unit 8. Then, local host 10 checks, for example, contents, such as a Device ID, a Vendor ID, and a Class Code, in advanced switching unit 8 (step S132). Thus, system host 2 checks the connected device.

Next, system host 2 writes predetermined contents into the configuration register (type 0)(refer to FIG. 8) in advanced switching unit 8 to configure the connected device (step S134). Here, the predetermined contents include, for example, a Base Address Register, a Command, and the like.

Thus, the initialization processing of adaptor 4 is performed.

(2.2.3. Table Setting Processing of Local Device)

Part (b) of FIG. 20 is a sequence chart showing operations of table setting processing of the local devices in the information processing apparatus and its peripheral apparatuses.

As shown in part (b) of FIG. 20, first, system host 2 registers a command of checking activation of local host 10 in control register group 32 of event notification unit 30 of advanced switching unit 8 (step S136).

Next, advanced switching unit 8 checks activation of local host 10 by the command registered in control register group 32 of event notification unit 30 (step S138).

Next, local host 10 sets address conversion table 42 and Req ID conversion table 44 in packet transfer unit 40 of advanced switching unit 8 (step S140). The setting is performed by use of address conversion table setting unit 64 and Req ID conversion table setting unit 66 of local host 10.

After the setting, advanced switching unit 8 of adaptor 4 notifies system host 2 of activation of local host 10 by interrupt processing (step S142).

Thus, the table setting processing of the local device is performed.

(2.2.4. Data Transfer Processing when Master Function Unit is Provided)

Figure 21:
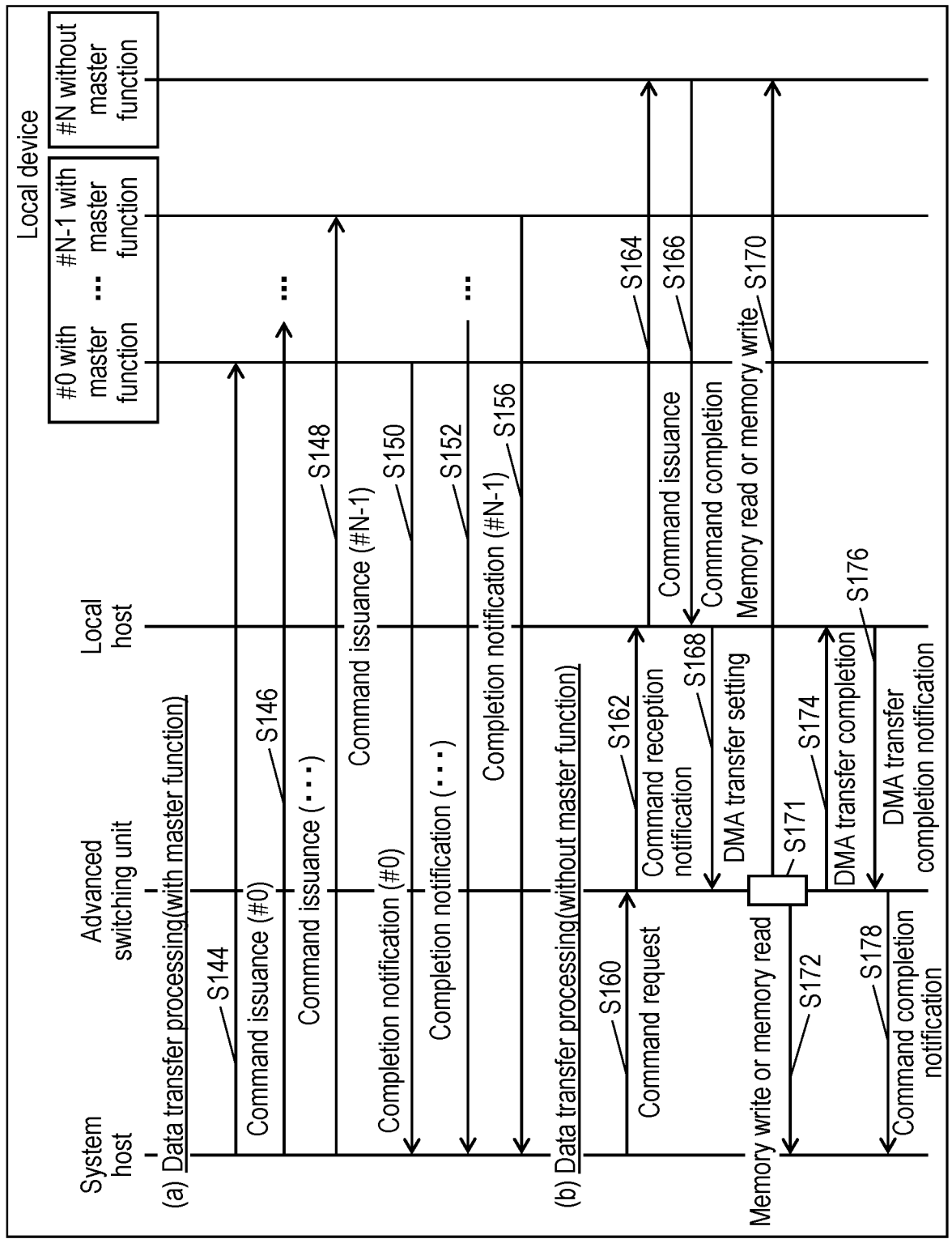
FIG. 21 is a sequence chart showing an operation of data transfer processing when a master function unit is provided and an operation of data transfer processing when the master function unit is not provided in the information processing apparatus according to the second exemplary embodiment.

Part (a) of FIG. 21 is a sequence chart showing operations of data transfer processing when the master function unit is provided in the information processing apparatus and its peripheral apparatuses.

Part (a) of FIG. 21 shows the data transfer processing in a case of local device 6 including master function unit 77.

As shown in part (a) of FIG. 21, first, system host 2 issues a transfer command to a plurality of (N) local devices 6 indicated by #0 to #N−1 (steps S144 to S148).

Then, each of local devices 6, upon completion of the transfer processing of transfer command, performs completion notification toward system host 2 (steps S150 to S156).

Note that, in the sequence chart shown in part (a) of FIG. 21, an address and a Req ID in the transfer command from system host 2 are converted by address converter 46 and Req ID converter 48 of packet transfer unit 40 of adaptor 4, respectively. Then, the converted transfer command is issued toward appropriate one of N local devices 6 (refer to part (a) of FIG. 22).

Meanwhile, when local device 6 having received the transfer command transfers data (data, address, and Req ID) to system host 2, the address and Req ID are converted by address converter 46 and Req ID converter 48 of advanced switching unit 8 (refer to part (b) of FIG. 22).

Thus, the data transfer processing in a case of local device 6 having master function unit is performed.

(2.2.5. Data Transfer Processing when Master Function Unit is not Provided)

Part (b) of FIG. 21 is a sequence chart showing operations of data transfer processing when the master function unit is not provided in the information processing apparatus and its peripheral apparatuses.

Part (b) of FIG. 21 shows the data transfer processing in a case of local device 6a having no master function unit.

As shown in part (b) of FIG. 21, first, system host 2 issues a transfer command. Then, system host 2 performs writing to a predetermined control register of event notification unit 30 of advanced switching unit 8. Thereby, system host 2 performs, to advanced switching unit 8, command request about issuance of the transfer command to local host 10 (step S160).

Next, advanced switching unit 8, upon receiving the command request, performs command reception notification about issuance of the transfer command to local host 10 (step S162).

Next, local host 10, upon receiving the command reception notification, issues a transfer command to local device 6a (step S164).

Next, local device 6a, upon receiving the transfer command, transmits notification indicating command completion to local host 10 (step S166). At this time, interrupt notification is performed by the above-described MSI interrupt.

Next, local host 10 requests configuration of DMA transfer unit 47 in packet transfer unit 40 of advanced switching unit 8 (step S168).

At this time, when the transfer command is a command indicating read of data from local device 6a, DMA transfer unit 47 first reads data of corresponding address in the memory of local device 6a (step S170). Then, DMA transfer unit 47, after the data transfer (step S171), writes data into memory 20 of system host 2 (step S172).

Meanwhile, when the transfer command is a command indicating write of data to local device 6a, DMA transfer unit 47 first reads data in the memory of system host 2 (step S172). Then, DMA transfer unit 47, after the data transfer (step S171), writes data into corresponding address in the memory of local device 6a (step S170).

Next, advanced switching unit 8 issues, to local host 10, completion of data transfer by DMA transfer unit 47 of packet transfer unit 40 (step S174).

Next, local host 10 performs, to advanced switching unit 8, interrupt transmission request about completion of transfer processing of local device 6 to system host 2 (step S176). Thereby, system host interrupt transmitter 34 of advanced switching unit 8, upon receiving the interrupt transmission request, performs interrupt notification about completion of the transfer processing of local device 6 to system host 2 (step S178).

Thus, the data transfer processing in a case of local device 6a having no master function unit is performed.

(2.2.6. Example of Address Conversion)

One example of address conversion between system host 2 and local host 10 or local devices 6, 6a will be described below with reference to FIGS. 22 to 24.

Part (a) of FIG. 22 shows one example of an address conversion table from system host 2 to local device 6. Part (b) of FIG. 22 shows one example of an address conversion table from a local device to a system host.

Figure 23:
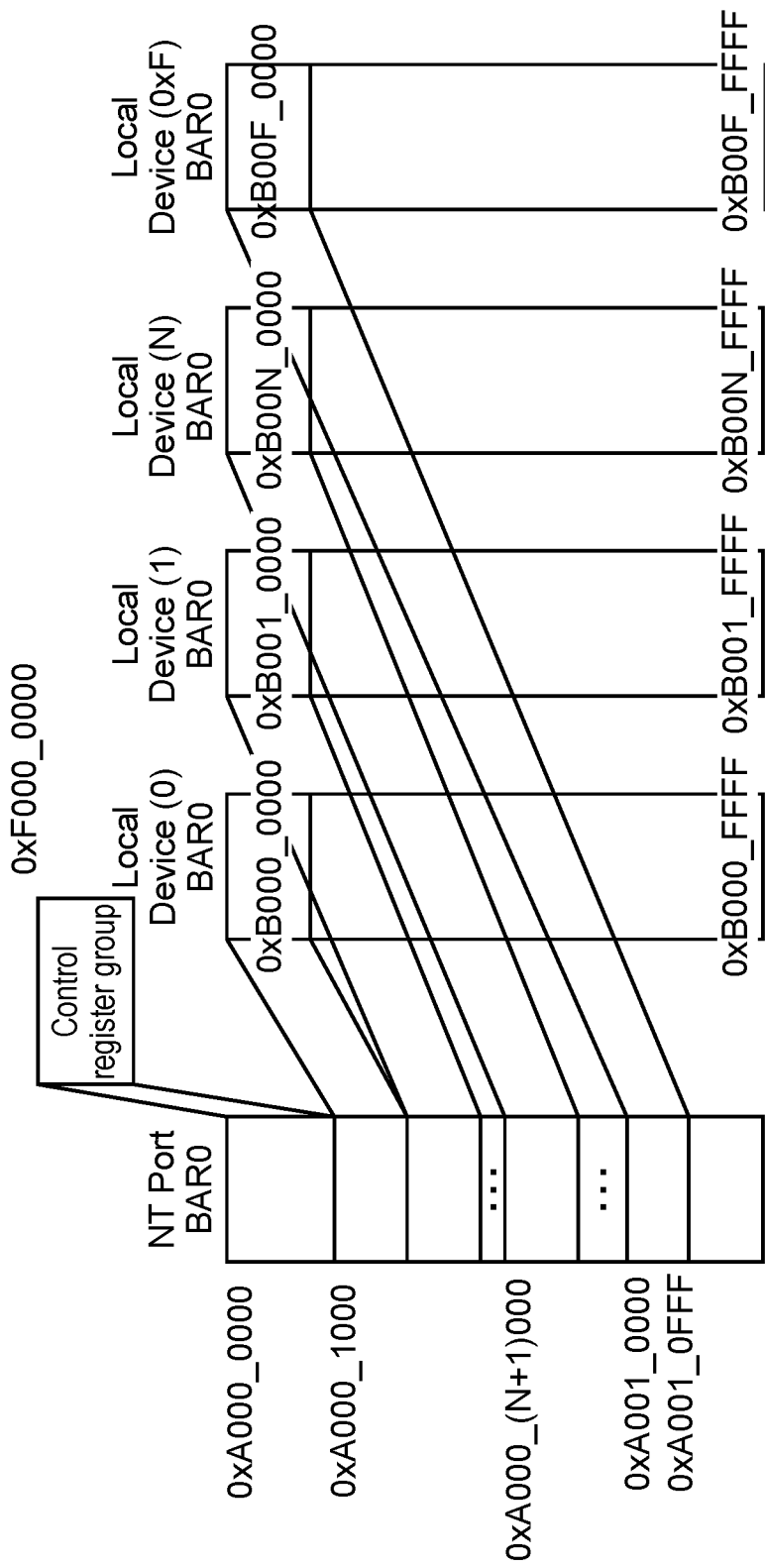
FIG. 23 is a diagram showing an example of address correspondence between the system host and the local device in the second exemplary embodiment.

FIG. 23 is a diagram showing correspondence relation of address conversion from system host 2 to local device 6 shown in part (a) of FIG. 22 in a BAR (Base Address Register) space.

As shown in FIG. 23, 0xA000_0000 to 0xA001_FFFF are assigned to addresses in the configuration space of system host 2.

At this time, as shown in part (a) of FIG. 22, of addresses of system host 2 shown in FIG. 23, 4K bytes (0x1000) from 0xA000_0000 correspond to 4K bytes (0x1000) from 0xF000_0000 on the local side. Further, 4K bytes (0x1000) from 0xA000_1000 of system host 2 correspond to 4K bytes (0x1000) from 0xB001_0000 on the local side. In addition, 4K bytes (0x1000) from 0xA000_2000 of system host 2 correspond to 4K (0x1000) from 0xB002_0000 on the local side.

Further, 4K bytes (0x1000) from 0xA000 (N+1)000 of system host 2 correspond to 4K (0x1000) from 0xB00N_0000 on the local side (however, 0<N<Fh (hex)).

In addition, 4K bytes (0x1000) from 0xA001_0000 of system host 2 correspond to 4K bytes (0x1000) from 0xB00F_0000 on the local side.

At this time, as shown in FIG. 23, 4K bytes (0x1000) from 0xF000_0000 on the local side are assigned to control register group 32 of advanced switching unit 8. In addition, 4K bytes (0x1000) from 0xB000_0000, 0xB001_0000, and 0xB00N_0000 on the local side and 4K bytes (0x1000) from 0xB00F_000 on the local side are assigned to local devices (0), (1), (N), and (0xF), respectively.

That is, a part of the memory space of each of local devices 6, which is to be controlled from system host 2, is mapped onto a memory space from system host 2 side. Then, each of the mapped parts is overlaid. Thereby, a plurality of local devices 6 are, as one virtual local device, reconfigured on a memory space (NT Port BAR0) from system host 2 side Next, correspondence relation of the converted addresses in the configuration space will be described with reference to FIG. 24.

Figure 24:
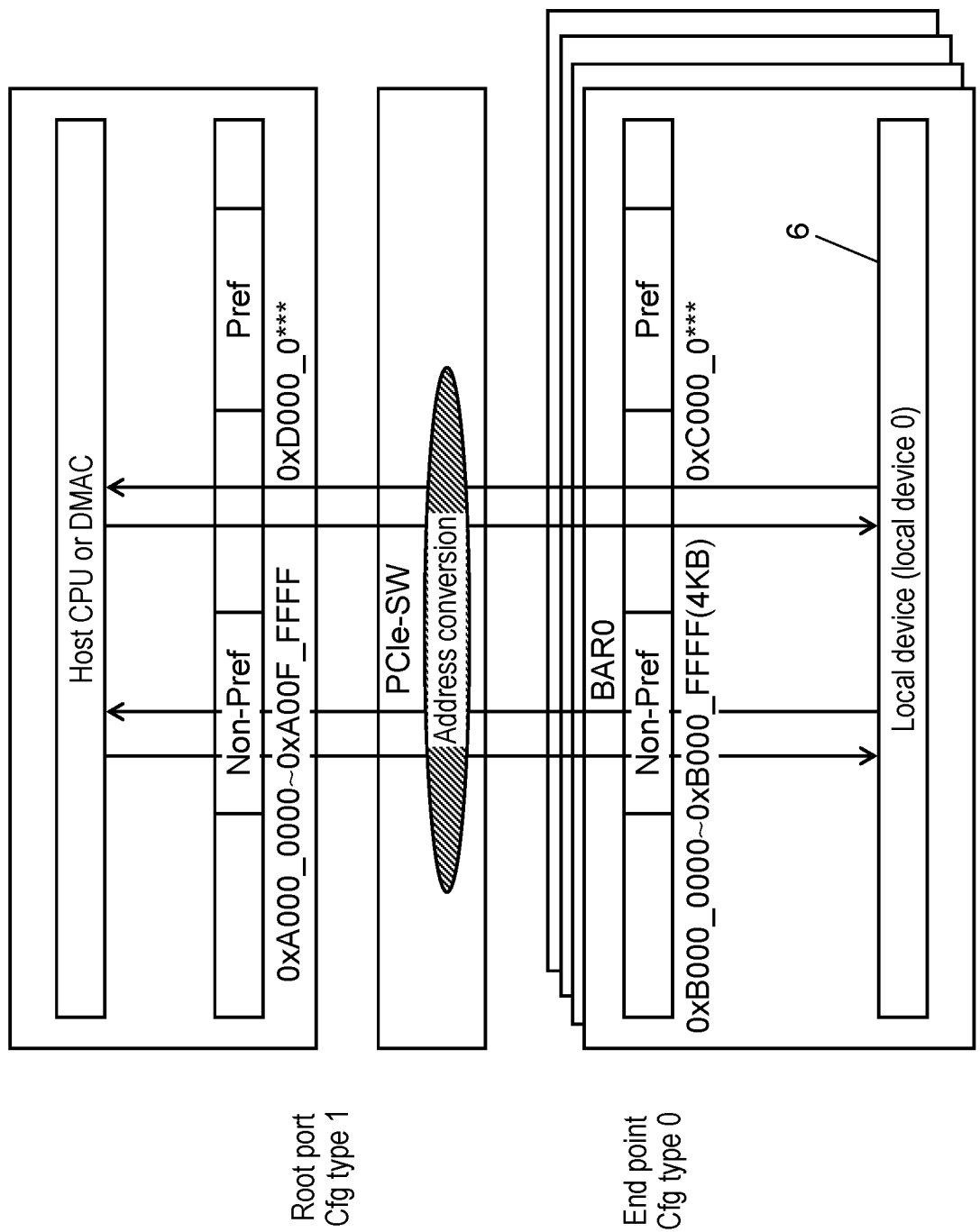
FIG. 24 is a diagram describing an example of address correspondence between the system host and the local device in the second exemplary embodiment.

FIG. 24 is a diagram describing correspondence relation of address conversion shown in FIG. 22 in the configuration space. Note that, FIG. 24 shows a plurality of local devices 6 in an overlapping manner, like a perspective diagram. Foremost local device 6 in FIG. 24 corresponds to local device (0) in FIG. 23.

As shown in FIG. 24, data transfer request from system host 2 to local device 6 is performed by use of a non-prefetch buffer space. That is, data transfer request is performed by use of virtual mapping on a memory space on system host 2 side.

To the configuration space on system host 2 side, 0xA000_0000 to 0xA00F_FFFF are assigned. Meanwhile, to the configuration space on local device 6 side corresponding to this, as shown in part (a) of FIG. 22, FIG. 23, and FIG. 24, 0xB000_0000 to 0xB000_FFFF are assigned.

Then, at the time of data transfer request from system host 2 to local device 6, an address on system host 2 side is converted into an address on local device 6 side by the address conversion table shown in part (a) of FIG. 22.

In addition, at the time of data transfer request from local device 6 to system host 2, a space (in FIG. 24, a prefetch buffer space) other than the non-prefetch buffer space is used.

At this time, 0xC000_0000 to 0xC000_0FFF are assigned to the configuration space on the local device side. Meanwhile, to the configuration space on system host 2 side corresponding to this, as shown in part (b) of FIG. 22 and FIG. 24, 0xD000_0000 to 0xD000_0FFF are assigned.

Thereby, at the time of data transfer request from local device 6 to system host 2, addresses on local host 10 side and on local device 6 side are converted to addresses on system host 2 side by the address conversion table shown in part (b) of FIG. 22.

Thus, address conversion is correlated between system host 2 and local host 10 or local devices 6, 6a.

(2.3. Effects and Other Benefits)

As described above, in the present exemplary embodiment, information processing apparatus 4 includes advanced switching unit 8. The PCIe bus from system host 2 is, via advanced switching unit 8, connected to a plurality of local devices (PCIe devices) 6, 6a and local host 10 that controls the local devices. A bus number of the PCIe bus on system host 2 side and a bus number of the PCIe bus on local host 10 side are assigned independently, and an address space of the PCIe bus on system host 2 side and an address space of the PCIe bus on local host 10 side are configured independently. Advanced switching unit 8 includes non-transparent ports 26, 28 as the data input and output ports and control register group 32 for communication between system host 2 and local host 10. Control register group 32 is directly connected with local host 10 by the PCIe bus, and is mapped onto the memory space from system host 2. System host 2 requests commands to local devices 6, 6a by use of control register group 32, and local host 10 interprets the commands requested to control register group 32 and issues the commands to local devices 6, 6a. Further, local devices 6, 6a notify local host 10 of an interrupt of command complete and local host 10 notifies system host 2 of the command completion via control register group 32. The data transfer between system host 2 and local devices 6, 6a is performed via advanced switching unit 8, and advanced switching unit 8 converts an address and a Requester ID on local host 10 side into an address and a Requester ID on system host 2 side. Then, advanced switching unit 8 transfers PCIe packets between local host 10 side and system host 2 side. In cases where local devices 6 support a master transfer function, advanced switching unit 8 is configured to map, of a memory space of each of local devices 6, a portion of the memory space to be controlled from system host 2 onto a memory space on system host 2 side and reconfigure a plurality of local devices 6 as one virtual local device 6.

According to this configuration, in a case of connecting to a plurality of local devices 6, 6a, the information processing apparatus maps necessary registers of local devices 6, 6a to a memory space appropriately from the perspective of system host 2. Thereby, resource shortage on system host 2 side can be resolved.

(Another Exemplary Embodiment)

As described above, the first and second exemplary embodiments are described as examples of techniques disclosed in the present application. However, the techniques according to the present disclosure are not limited to these exemplary embodiments, and are applicable to any exemplary embodiment achieved through appropriate modification, replacement, addition, removal, or the like. A new exemplary embodiment can also be made by a combination of the components of the first and second exemplary embodiments.

For example, the present disclosure is an information processing apparatus that is connected with the system host via the PCIe bus. The information processing apparatus includes the local host and the advanced switching unit. The advanced switching unit has non-transparent ports as data input and output ports and a control register group for communication of the system host. The PCIe bus of the system host is connected to the plurality of PCIe devices via the information processing apparatus. A bus number of the PCIe bus on the system host side and a bus number of the PCIe bus on the local host side are assigned independently by the non-transparent ports, and an address space of the PCIe bus on the system host side and an address space of the PCIe bus on the local host side are configured independently by the non-transparent ports. The control register group is directly accessed from the local host and is mapped onto a memory space on the system host side when the control register group is accessed from the system host. The local host interprets a command which is requested, by the system host, to the control register group mapped onto the memory space on the system host side and issues the command to each of the PCIe devices. The local host receives an interrupt of command complete from each of the PCIe devices and notifies the system host of the command completion via the control register group. Data transfer between the system host and each of the PCIe devices is performed via the advanced switching unit. The advanced switching unit converts an address and a Requester ID on the local host side into an address and a Requester ID on the system host side and transfers PCIe packets between each of the PCIe devices and the system host. Then, the advanced switching unit is configured to map, of a memory space on the local host side when each of the PCIe devices is seen from the local host, a portion of the memory space to be controlled from each of the PCIe devices onto the memory space on the system host side and reconfigure the plurality of PCIe devices as one virtual PCIe device.

In addition, in a case where each of the PCIe devices supports a master transfer function, the advanced switching unit of the information processing apparatus of the present disclosure may be configured to map, of the memory space on the local host side when each of the PCIe devices is seen from the local host, a portion of the memory space that is to be controlled from the system host onto the memory space on the system host side, and reconfigure the plurality of PCIe devices as one virtual PCIe device.

The advanced switching unit of the information processing apparatus of the present disclosure further includes a direct memory access transfer unit which is capable of performing a direct transfer function that the advanced switching unit initiates data transfer as a bus master in the PCIe bus. In a case where each of the PCIe devices does not support the master transfer function, in the data transfer between the system host and each of the PCIe devices, the advanced switching unit may be configured to perform data transfer as a master for each of the PCIe devices and the system host between the memory space on the local host side of the each of the PCIe devices and the memory space on the system host side with the direct transfer function of the direct memory access transfer unit.

In addition, in the information processing apparatus of the present disclosure, the communication path between the system host, the information processing apparatus, and the plurality of PCIe devices may be configured so as to be capable of equivalently transmitting and receiving PCIe packets by performing communication with the PCIe packets wrapped in packets of another communication protocol.

In addition, in the information processing apparatus of the present disclosure, the local host may be provided inside the advanced switching unit.

In addition, in the information processing apparatus of the present disclosure, PCIe packets in the communication path may be configured by a bus in which the PCI packets are switched based on an address and a Requester ID.

Figure 25:
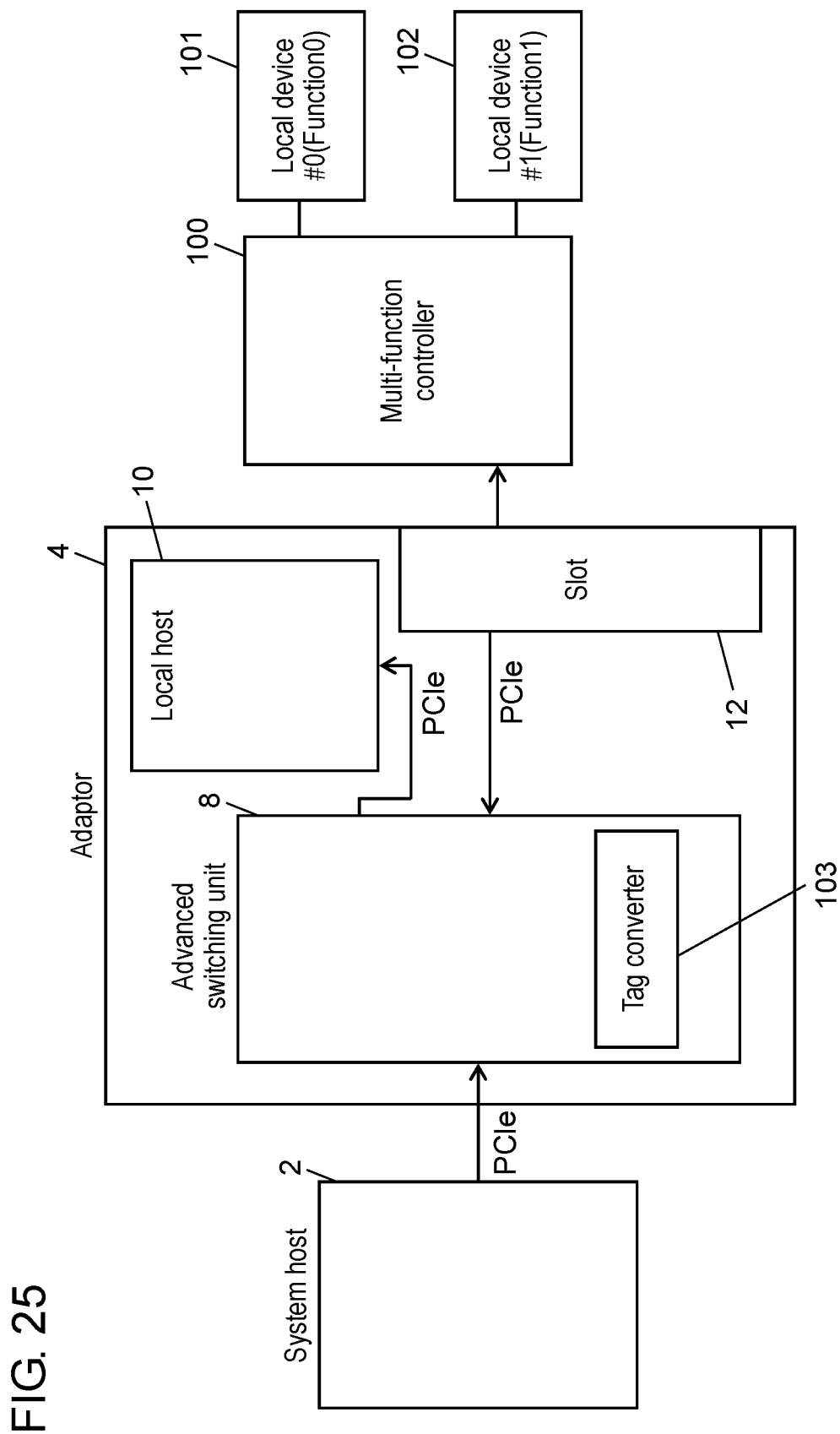
FIG. 25 is a schematic block diagram of an information processing system including an information processing apparatus in another exemplary embodiment.

In addition, the information processing apparatus of the present disclosure may be configured as shown in FIG. 25, in a case of corresponding to a multi-function device in which a plurality of devices are logically connected to a single PCIe bus. That is, an information processing apparatus shown in FIG. 25 includes Tag converter 103, multi-function controller 100, and local devices #0, #1 (101, 102). Tag converter 103 may be configured to convert a value of a Tag between system host 2 and adaptor 4 into a value of a function number between adaptor 4 and multi-function controller 100.

Specific operation of Tag converter 103 will be described with reference to FIGS. 26 to 28.

FIG. 26 is a diagram showing one example of a specific conversion value of the Tag converter in an information processing system including the information processing apparatus of FIG. 25. FIG. 27 is a diagram describing an Extended Tag Field Enable bit in a device control register of the other exemplary embodiment. FIG. 28 is a diagram describing a Requester ID and a Tag of the other exemplary embodiment.

As shown in FIG. 26, first, for conversion between system host 2 and local device #0 (101), 001b is set to high-order 3 bits of Extended Tag. The set high-order bits 001b of Extended Tag are converted into a function number 0 by Tag converter 103 provided in advanced switching unit 8. Further, the high-order 3 bits of Extended Tag are replaced with 000b. Note that, low-order 5 bits xxxxxb of Extended Tag shown in FIG. 26 directly use a value that is added when a device of a transfer source transfers PCIe packets.

Similarly, for conversion between system host 2 and local device #1 (102), as shown in FIG. 26, first, 010b is set to high-order 3 bits of Extended Tag. The set high-order bits 010b of Extended Tag are converted into a function number 1 by Tag converter 103. Further, high-order 3 bits of Extended Tag are replaced with 000b.

Then, as shown in FIG. 27, the Extended Tag Field Enable bit in the device control register that enables Extended Tag is enabled. This makes it possible to use high-order 3 bits of Extended Tag. Note that, the high-order 3 bits of 8 bits in Extended Tag shown in FIG. 28 correspond to Extended Tag Region. Thus, in a case where the information processing apparatus of the present disclosure corresponds to the multi-function device, Tag converter 103 extends a value of the Tag to convert the Extended Tag. Then, based on the converted Extended Tag, the information processing apparatus may be configured to perform switching of PCIe packets with respect to the corresponding local device.

Figure 29:
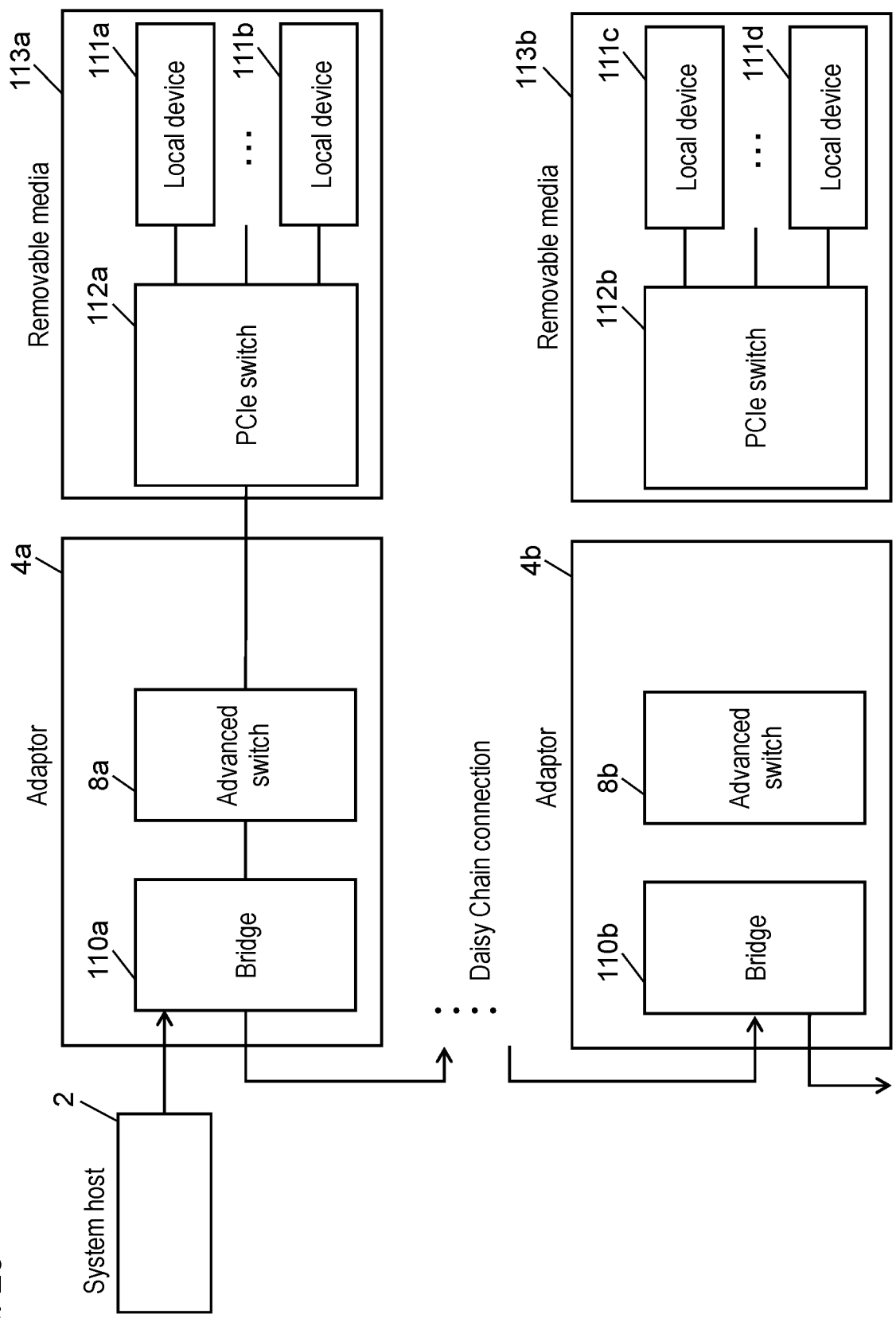
FIG. 29 is a schematic block diagram of an information processing system including an information processing apparatus in still another exemplary embodiment.

In addition, the information processing system including the information processing apparatus of the present disclosure may be configured to connect a plurality of adaptors 4a, 4b to system host 2, as shown in FIG. 29.

FIG. 29 is a schematic block diagram of an information processing system including an information processing apparatus in still another exemplary embodiment.

As shown in FIG. 29, in the information processing system including the information processing apparatus of the present disclosure, adaptors 4a, 4b are connected to system host 2, for example, in a daisy Chain form. Then, adaptor 4a, 4b switches PCIe packets related to own adaptor 4a, 4b to own advanced switch 8a, 8b by bridges 110a to 110b, respectively. Advanced switch 8a, 8b terminates the PCIe bus as the end point.

Local devices 111a, 111b, 111c, 111d in removable media 113a, 113b are connected to adaptors 4a, 4b via PCIe switches 112a, 112b.

That is, advanced switch 8a, 8b terminates the PCIe bus as the end point. Thereby, even if bus numbers in removable media 113a, 113b are changed, the configuration on system host 2 side does not change. Therefore, it is easy to respond to insertion and removal of removable media 113a, 113b.

Note that, in each of the above exemplary embodiments, the example of the configuration in which advanced switching unit 8 interprets a command requested to control register group 32 and issues the command to each of the PCIe devices is described, but the exemplary embodiments are not limited thereto. In a case where system host 2, adaptor 4, and local device 6 use different transfer systems, for example, system host 2 side and adaptor 4 side use NVMe (Non Volatile Memory Express) and local device 6 side uses SATA (Serial-ATA), advanced switching unit 8 may be configured to interpret a command requested to control register group 32 and issue the command to each of the PCIe devices.

Meanwhile, in a case where system host 2, adaptor 4, and local device 6 use the same transfer system (NVMe), advanced switching unit 8 may be configured not to interpret a command but to be switched so as to directly issue the command to local device 6. With these configurations, advanced switching unit 8 of adaptor 4 can appropriately switch processing according to the local device to be connected.

Note that, the above exemplary embodiments are an illustration of the technique of the present disclosure. Therefore, various changes, replacements, additions, or omissions may be made to the exemplary embodiments within the scope of claims or their equivalents.

INDUSTRIAL APPLICABILITY

The present disclosure can be applied to an information processing apparatus equipped with a plurality of removable media. Specifically, the present disclosure can be applied to a video server and the like.

REFERENCE MARKS IN THE DRAWINGS

2: system host
4, 4a, 4b: adaptor (information processing apparatus)
6, 6a, 101, 102, 111a, 111b, 111c, 111d: local device (PCIe device)
8: advanced switching unit
8a, 8b: advanced switch
10: local host
12: slot
14: non-volatile memory
20, 70: memory
22, 68: root complex
24: processor (CPU)
26, 28: NT port (non-transparent port)
30: event notification unit
32: control register group
34: system host interrupt transmitter
36: local host interrupt transmitter
38: insertion and removal detector
40: packet transfer unit
42: address conversion table
44: Req ID conversion table
46: address converter
47: DMA transfer unit
48: Req ID converter
50: PCIe switch
58: local controller
60: local device initialization unit
62: local device type discriminator
64: address conversion table setting unit
66: Req ID conversion table setting unit
76, 76a: command analyzer
77: master function unit
78, 78a: data transfer unit
100: multi-function controller
103: Tag converter
110a, 110b: bridge
112a, 112b: PCIe switch
113a, 113b: removable media

The invention claimed is:

1. An information processing apparatus that is connected to a system host via a PCIe bus (PCI Express bus), the information processing apparatus comprising:
a local host; and
an advanced switching unit, wherein:
the advanced switching unit includes
non-transparent ports as data input and output ports, and
a control register group for communication of the system host;
the PCIe bus of the system host is connected to a plurality of PCIe devices via the information processing apparatus;
a bus number of the PCIe bus on the system host side and a bus number of a PCIe bus on the local host side are assigned independently by the non-transparent ports, and an address space of the PCIe bus on the system host side and an address space of a PCIe bus on the local host side are configured independently by the non-transparent ports;
the control register group (i) is directly accessed from the local host and (ii) is mapped onto a memory space on the system host side when the control register group is accessed from the system host;
the local host
interprets a command which is requested, by the system host, to the control register group mapped onto the memory space on the system host side and issues the command to the PCIe devices,
receives an interrupt of command complete from each of the PCIe devices, and
notifies the system host of the command completion via the control register group;
data transfer between the system host and each of the PCIe devices is performed via the advanced switching unit; and
the advanced switching unit is configured to reconfigure the plurality of PCIe devices as one virtual PCIe device, the advanced switching unit:
converts an address and a Requester ID on the local host side into an address and a Requester ID on the system host side and transfers PCIe packets between each of the PCIe devices and the system host; and
maps a portion of the memory space on the local host side onto the memory space on the system host side, the portion being a portion that is controlled by each of the PCIe devices, respectively;
wherein when the advanced switching unit reconfigures the plurality of PCIe devices as one virtual PCIe device, for each PCIe device, among the plurality of PCIe devices, that supports a master transfer function, the advanced switching unit maps a portion of the memory space that is controlled by each PCIe device that supports a master transfer function, respectively, on the local host side onto the memory space on the system host side.

2. The information processing apparatus according to claim 1, wherein a communication path between the system host, the information processing apparatus, and the plurality of PCIe devices is configured so as to be capable of equivalently transmitting and receiving the PCIe packets through the communication path.

3. The information processing apparatus according to claim 2, wherein the PCIe packets in the communication path are configured by a bus in which the PCI packets are switched based on the address and the Requester ID.

4. An information processing apparatus that is connected to a system host via a PCIe bus (PCI Express bus), the information processing apparatus comprising:
   a local host; and
   an advanced switching unit, wherein:
   the advanced switching unit includes
      non-transparent ports as data input and output ports, and
      a control register group for communication of the system host;
   the PCIe bus of the system host is connected to a plurality of PCIe devices via the information processing apparatus;
   a bus number of the PCIe bus on the system host side and a bus number of a PCIe bus on the local host side are assigned independently by the non-transparent ports, and an address space of the PCIe bus on the system host side and an address space of a PCIe bus on the local host side are configured independently by the non-transparent ports;
   the control register group (i) is directly accessed from the local host and (ii) is mapped onto a memory space on the system host side when the control register group is accessed from the system host;
   the local host
      interprets a command which is requested, by the system host, to the control register group mapped onto the memory space on the system host side and issues the command to the PCIe devices,
      receives an interrupt of command complete from each of the PCIe devices, and
      notifies the system host of the command completion via the control register group;
   data transfer between the system host and each of the PCIe devices is performed via the advanced switching unit; and
   the advanced switching unit is configured to reconfigure the plurality of PCIe devices as one virtual PCIe device, the advanced switching unit:
      converts an address and a Requester ID on the local host side into an address and a Requester ID on the system host side and transfer PCIe packets between each of the PCIe devices and the system host; and
      maps a portion of the memory space on the local host side onto the memory space on the system host side, the portion being a portion that is controlled by each of the PCIe devices, respectively;
   wherein
   the advanced switching unit further includes a direct memory access transfer unit which is capable of performing a direct transfer function with which the advanced switching unit initiates data transfer as a bus master in the PCIe bus,
   the advanced switching unit is configured, in a case where none of the PCIe devices supports a master transfer function, to perform data transfer between the system host and the each of the PCIe devices as a master for both of the each of the PCIe devices and the system host, and
   the data transfer is performed between the memory space on the local host side of the PCIe devices and the memory space on the system host side with the direct transfer function of the direct memory access transfer unit.

5. The information processing apparatus according to claim 4, wherein a communication path between the system host, the information processing apparatus, and the plurality of PCIe devices is configured so as to be capable of equivalently transmitting and receiving the PCIe packets through the communication path.

6. The information processing apparatus according to claim 5, wherein the PCIe packets in the communication path are configured by a bus in which the PCI packets are switched based on the address and the Requester ID.

* * * * *